US012473753B2

(12) United States Patent
Vande Haar et al.

(10) Patent No.: US 12,473,753 B2
(45) Date of Patent: Nov. 18, 2025

(54) FENESTRATION AUTOMATION SYSTEMS AND METHODS

(71) Applicant: Pella Corporation, Pella, IA (US)

(72) Inventors: Evan R. Vande Haar, Pella, IA (US); Todd A. Bernhagen, Pella, IA (US)

(73) Assignee: Pella Corporation, Pella, IA (US)

( * ) Notice: Subject to any disclaimer, the term of this patent is extended or adjusted under 35 U.S.C. 154(b) by 0 days.

(21) Appl. No.: 18/198,000

(22) Filed: May 16, 2023

(65) Prior Publication Data

US 2023/0313565 A1 Oct. 5, 2023

Related U.S. Application Data

(63) Continuation of application No. 15/942,149, filed on Mar. 30, 2018, now Pat. No. 11,692,371.
(Continued)

(51) Int. Cl.
*E05B 47/00* (2006.01)
*E05B 63/14* (2006.01)
(Continued)

(52) U.S. Cl.
CPC .......... *E05B 47/0012* (2013.01); *E05B 63/14* (2013.01); *E05B 65/0858* (2013.01);
(Continued)

(58) Field of Classification Search
CPC .. E05B 47/00; E05B 47/0001; E05B 47/0012; E05B 2047/0016; E05B 2047/002; E05B 2047/0036; E05B 2047/0067; E05B 2047/0068; E05B 2047/0069; E05B 2047/0081; E05B 63/14; E05B 63/143; E05B 2047/0091; E05B 15/004; E05C 3/00; E05C 3/006; E05C 3/008; E05C 3/12; E05C 3/16; E05C 3/165; E05C 3/167; E05C 3/22; E05C 3/24; E05C 3/26; E05C 3/28; E05C 3/30; E05C 3/34; E05C 3/40; E05C 9/021; E05C 9/12; Y10T 292/081;
(Continued)

(56) References Cited

U.S. PATENT DOCUMENTS 4,738,052 A 4/1988 Yoshida
5,537,848 A 7/1996 Grzanka et al.
(Continued)

FOREIGN PATENT DOCUMENTS

EP 1001122 A1 5/2000
EP 1350914 A2 10/2003
(Continued)

OTHER PUBLICATIONS

Computer Generated Translation for EP 1001122 A1, Generated on Dec. 22, 2022, https://worldwide.espacenet.com/ (Year: 2022).
(Continued)

*Primary Examiner* — Alyson M Merlino

(57) ABSTRACT

A fenestration assembly including a panel, a lock assembly coupled to the panel, and an actuation system coupled to the lock assembly. The lock assembly includes a motor, a transmission driven by the motor, a sensing assembly, and a slide assembly that includes a rack member operatively coupled to the motor by the transmission and a drive bracket member that is slidable by the rack member between a locked drive bracket member position and an unlocked drive bracket member position.

21 Claims, 19 Drawing Sheets

Related U.S. Application Data

(60) Provisional application No. 62/482,501, filed on Apr. 6, 2017.

(51) Int. Cl.

| | |
|---|---|
| ***E05B 65/08*** | (2006.01) |
| ***E05C 3/00*** | (2006.01) |
| ***E05C 3/12*** | (2006.01) |
| ***E05C 3/24*** | (2006.01) |
| ***F16H 19/04*** | (2006.01) |

(52) U.S. Cl.

CPC ................ *E05C 3/008* (2013.01); *E05C 3/12* (2013.01); *E05C 3/24* (2013.01); *F16H 19/04* (2013.01); *E05B 2047/0016* (2013.01); *E05B 2047/002* (2013.01); *E05B 2047/0067* (2013.01); *E05B 2047/0068* (2013.01); *E05B 2047/0081* (2013.01); *E05B 2047/0094* (2013.01)

(58) Field of Classification Search

CPC ......... Y10T 292/0832; Y10T 292/0859; Y10T 292/0852; Y10T 292/1082; Y10T 292/308; Y10S 292/46

See application file for complete search history.

(56) References Cited

U.S. PATENT DOCUMENTS

| | | | |
|---|---|---|---|
| 5,623,784 | A | 4/1997 | Kuersten et al. |
| 5,656,898 | A | 8/1997 | Kalina |
| 5,711,112 | A | 1/1998 | Barten et al. |
| 5,813,171 | A | 9/1998 | Piltingsrud |
| 5,815,984 | A | 10/1998 | Sheets et al. |
| 5,852,897 | A | 12/1998 | Sukale |
| 5,925,861 | A | 7/1999 | Fromberg |
| 6,078,256 | A | 6/2000 | Gottlieb |
| 6,139,070 | A | 10/2000 | Piltingsrud |
| 6,314,681 | B1 | 11/2001 | Moody |
| 6,490,832 | B1 | 12/2002 | Fischbach et al. |
| 6,543,581 | B1 | 4/2003 | Durand et al. |
| 6,568,726 | B1 | 5/2003 | Caspi et al. |
| 6,595,889 | B2 | 7/2003 | Minegishi et al. |
| 6,918,210 | B1 | 7/2005 | Smiley |
| 7,013,604 | B1 | 3/2006 | Moody et al. |
| 7,158,029 | B1 | 1/2007 | Martyn |
| 7,178,839 | B2 | 2/2007 | Tsai |
| 7,237,811 | B1 | 7/2007 | Lawrence |
| 7,708,322 | B2 | 5/2010 | Timothy et al. |
| 7,770,943 | B2 | 8/2010 | Kaiser |
| 7,992,346 | B2 | 8/2011 | Finke |
| 8,109,040 | B2 | 2/2012 | Finke |
| 8,269,627 | B2 | 9/2012 | Gore et al. |
| 8,365,470 | B1 | 2/2013 | Campbell et al. |
| 8,434,265 | B1 | 5/2013 | Campbell et al. |
| 8,474,185 | B2 | 7/2013 | Busch |
| 8,494,680 | B2 | 7/2013 | Sparenberg et al. |
| 8,572,896 | B2 | 11/2013 | Busch |
| 8,624,736 | B2 | 1/2014 | Gore et al. |
| 8,769,873 | B2 | 7/2014 | Feng et al. |
| 8,800,206 | B2 | 8/2014 | Vaknin et al. |
| 8,857,015 | B2 | 10/2014 | Hufen et al. |
| 8,876,172 | B2 | 11/2014 | Denison et al. |
| 9,097,037 | B2 | 8/2015 | Mckibben et al. |
| 9,790,716 | B2 | 10/2017 | Hagemeyer et al. |
| 11,692,371 | B2 | 7/2023 | Vande Haar et al. |
| 2011/0232193 | A1 | 9/2011 | Thorne |
| 2011/0302843 | A1 | 12/2011 | Dallmann et al. |
| 2012/0169071 | A1 | 7/2012 | Labarre |
| 2012/0292925 | A1 | 11/2012 | Lundberg et al. |
| 2014/0076072 | A1 | 3/2014 | Gore et al. |
| 2018/0291651 | A1 | 10/2018 | Vande et al. |

FOREIGN PATENT DOCUMENTS

| | | | |
|---|---|---|---|
| EP | 2752549 | B1 | 10/2016 |
| GB | 2348311 | A | 9/2000 |
| KR | 10-0891104 | B1 | 3/2009 |
| WO | 2013/182947 | A1 | 12/2013 |

OTHER PUBLICATIONS

Definition of “relative” from Dictionary.com, https://www.dictionary.com/browse/relative (Year: 2022).

FENESTRATION AUTOMATION SYSTEMS AND METHODS

CROSS-REFERENCE TO RELATED APPLICATION

This application in a Continuation of U.S. Non-Provisional application Ser. No. 15/942,149, filed Mar. 30, 2018 that further claims priority to U.S. Provisional Application No. 62/482,501, filed Apr. 6, 2017, which are herein incorporated by reference in its entirety.

TECHNICAL FIELD

Various aspects of the instant disclosure relate to sensing and actuation systems for lock/latch hardware associated with fenestration products, such as sliding glass patio doors. In some specific examples, the disclosure concerns a multifunctional actuation system or sensing system, and combinations thereof.

BACKGROUND

Fenestration system automation, such as status sensing and control of window and door products, continues to be of great interest in residential, commercial, and industrial settings, for example. Efficient and reliable actuation and status sensing of fenestration products can help enhance safety, security, energy efficiency, and other functionality. Systems that are multi-functional, compact in design, applicable across multiple fenestration product types, and/or capable of communication with standard and custom home automation and security systems, for example, are of particular interest. The opportunity for innovation and improvement in any of these areas remain and is the focus of various examples of fenestration automation systems and methods provided by this disclosure.

SUMMARY

Various aspects of the disclosure relate to lock actuators configured to actuate lock assemblies between locked and unlocked positions and to allow manual operation of the lock assemblies following actuation to the locked and unlocked positions, as well as methods of actuating lock assemblies including actuating the lock assemblies between locked and unlocked positions such that manual operation of the lock assemblies is permitted following actuation to the locked and unlocked positions. While multiple, inventive examples are specifically disclosed, various modifications and combinations of features from those examples will become apparent to those skilled in the art from the following detailed description. Accordingly, the disclosed examples are meant to be regarded as illustrative in nature and not restrictive.

BRIEF DESCRIPTION OF THE DRAWINGS

In FIGS. 9-11, the lock assembly is shown without a second plate and only strike posts of first and second strikes are shown in broken lines to facilitate operational illustration, according to some examples.

DETAILED DESCRIPTION

Locking systems according to the inventive examples can be employed in a variety of fenestration units, including sliding patio doors, for example. The locking systems provide a variety of features, including improved door/frame catch alignment, prevention of lock actuation when door catches are in an open position, compatibility with sensing and automation systems, as well as others.

Figure 1:
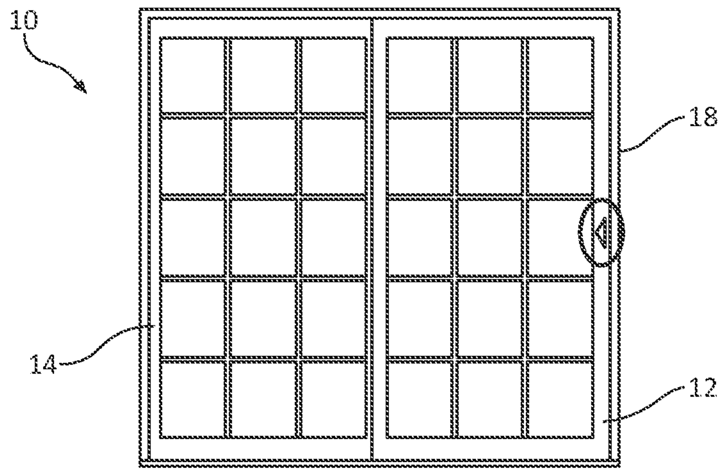
FIG. 1 is a schematic view of a fenestration assembly, according to some examples.

FIG. 1 is a schematic view of a fenestration assembly 10 including a first panel 12, a second panel 14, and a frame 18, according to some examples. The first panel 12 is optionally a panel that opens by sliding, often termed a "vent" panel and the second panel 14 is optionally a stationary panel, often termed a "fixed" panel. Panels of fenestration units (e.g., door panels) are often described in terms of vertical stiles and horizontal rails. Frames of fenestration units are often described in terms of vertical side jambs, a horizontal head, and a horizontal sill. Some examples of suitable fenestration units usable with locking systems according to the instant disclosure include those sold under the trade name "PROLINE 450 SERIES," "ARCHITECT SERIES," and "DESIGNER SERIES" by Pella Corporation of Pella, Iowa. In the usual manner, the first panel 12 is slidably mounted within a roller track, for example, horizontal movement between the jambs. Although the examples below are provided with reference to a sliding door, it should be understood that these features are equally applicable to other types of doors and windows, such as sliding windows, casement windows, or others.

Figure 2:
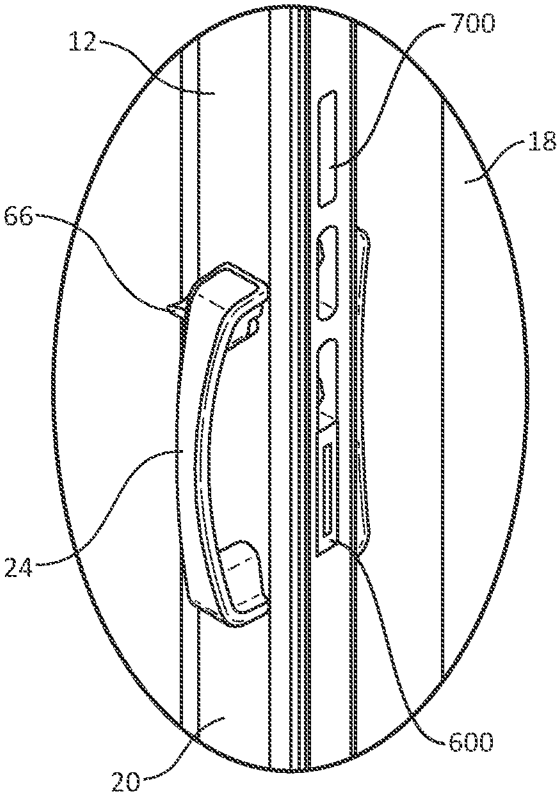
FIG. 2 is a perspective view of a portion of the fenestration assembly indicated in FIG. 1 with a first panel partially opened or ajar, according to some examples.

FIG. 2 is a perspective view of a portion of the fenestration assembly indicated in FIG. 1 with the first panel 12 partially opened or ajar, according to some examples. As indicated on FIGS. 1 and 2, the first panel 12 includes a lock stile 20, also described as a panel edge, and the frame 18 includes a lock jamb 22, also described as a frame edge. The lock stile 20 defines a pocket 20*a* for receiving a portion of a locking system 30 (FIG. 3) and the lock jamb 22 includes a pocket 22*a* for receiving a complementary portion of the locking system 30 to that of the lock stile 20. As shown in FIG. 2, the lock stile 20 includes a handle 24 to assist with moving the first panel 12 and one or more operators for locking and unlocking the locking system 30. As described in further detail, the fenestration assembly also includes a lock sensor system 600 received in the lock jamb 22.

Figure 3:
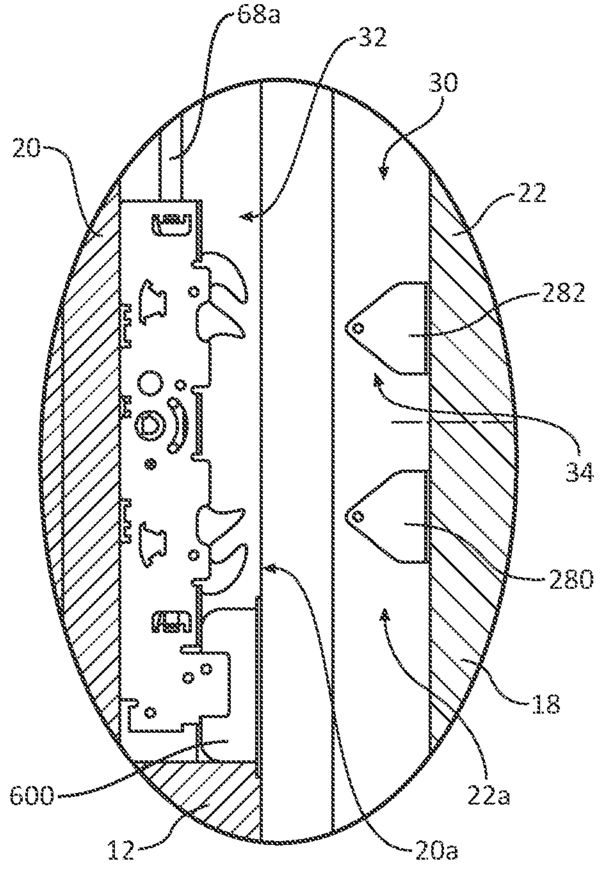
FIG. 3 shows the portion of the fenestration assembly indicated in FIG. 1 with partial sections of a lock stile and lock jamb removed for ease of visualization, according to some examples.

FIG. 3 shows the portion of the fenestration assembly 10 indicated in FIG. 1 with partial sections of the lock stile 20 and lock jamb 22 removed for ease of visualization, according to some examples. As shown, the locking system 30 of the fenestration assembly 10 includes a lock assembly 32, also described as a catch assembly, installed as part of the lock stile 20 and a strike assembly 34, also described as a catch receiver assembly, installed as part of the lock jamb 22. In different terms, the lock stile 20 can be said to include the lock assembly 32 and the lock jamb 22 can be said to include the strike assembly 34, although a reversal of positions of the lock assembly 32 and the strike assembly 34 is contemplated (e.g., where the lock assembly 32 is part of the lock jamb 22 and the strike assembly 34 is part of the lock stile 20). Various components of the lock assembly and strike assembly 34 are optionally formed of metal and/or plastic components using one or more punching, bending, casting, molding and/or other manufacturing methods as desired.

Figure 4:
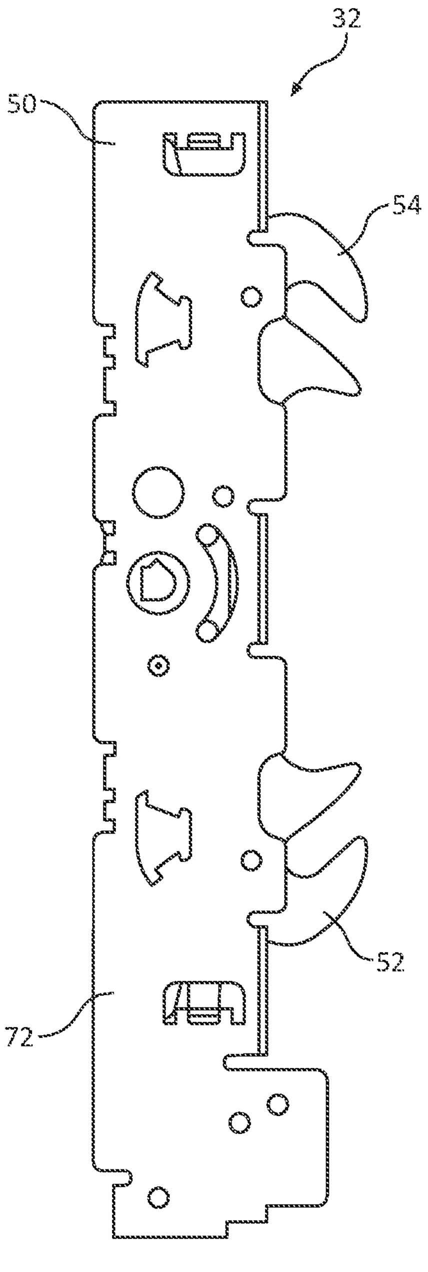
FIG. 4 is a side view of a lock assembly of the fenestration assembly in an open state and FIG. 5 is a side view of the lock assembly in a closed state, according to some examples.
Figure 5:
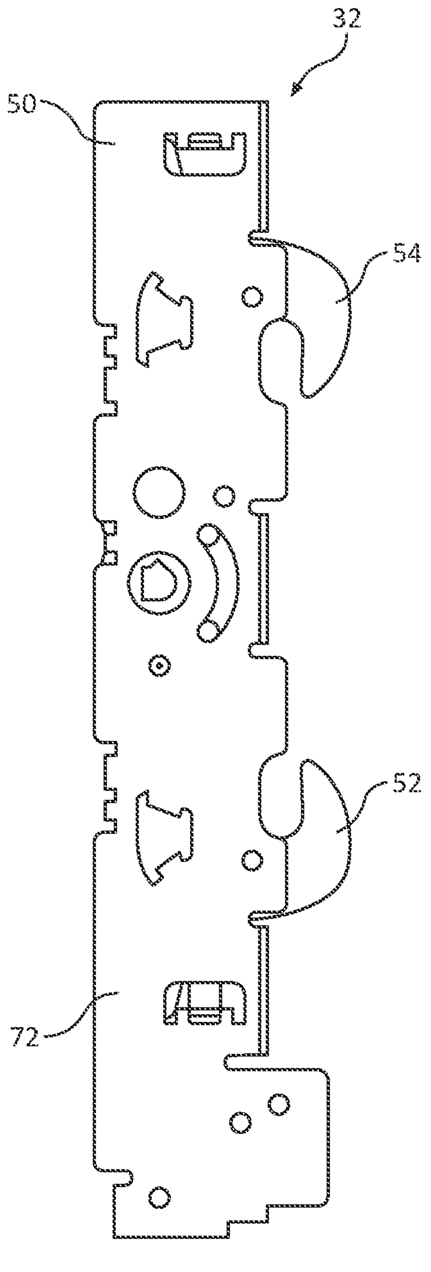
Figure 6:
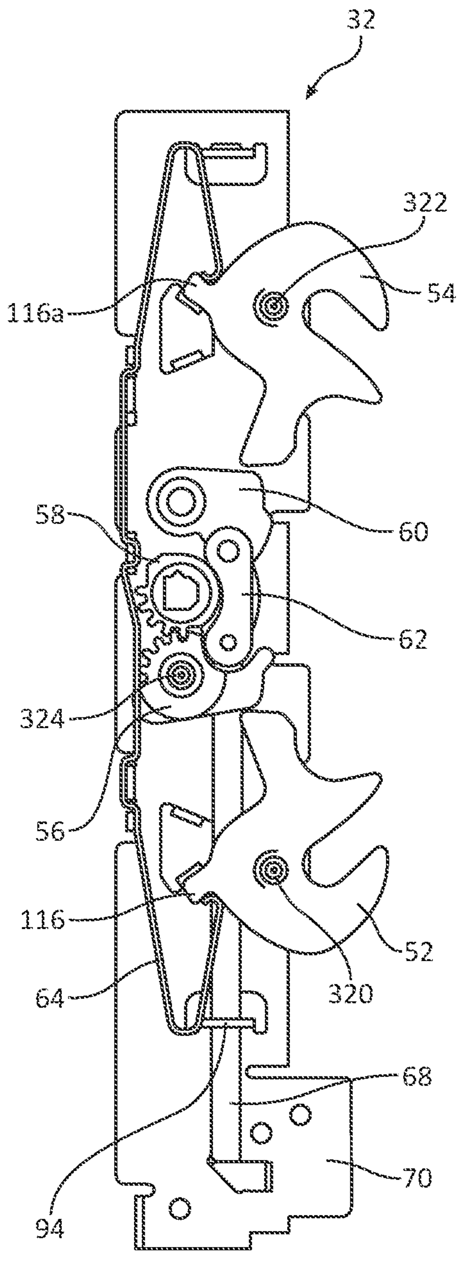
FIG. 6 is a side view of the lock assembly with a portion of a housing of the lock assembly removed to show internal components of the lock assembly.

FIG. 4 is a side view of the lock assembly 32 in an open state and FIG. 5 is a side view of the lock assembly 32 in a closed state, according to some examples. As described in greater detail, the lock assembly 32 is configured to transition from the open state to the closed state during engagement with the strike assembly 34. FIG. 6 is a side view of the lock assembly 32 with a portion of a housing 50 of the lock assembly 32 removed to show internal components of the lock assembly 32. As shown, the lock assembly 32 includes a first catch 52 pivotally secured to the housing 50, a second catch 54 pivotally secured to the housing 50, a cam gear 56, a reversal gear 58, a lock cam 60, a link 62, and a spring 64. The lock assembly 32 also optionally includes an interior lock operator 66 (FIG. 2) and exterior lock operator (e.g., a key-operated lock cylinder, not shown) for manually operating the reversal gear 58 between its locked and unlocked positions. In some examples, the lock assembly 32 also includes an accessory bar 68, for interaction with a sensor (e.g., wireless sensor system) and/or an accessory bar 68*a* for interaction with an actuator (e.g., electric motor system).

Figure 13:
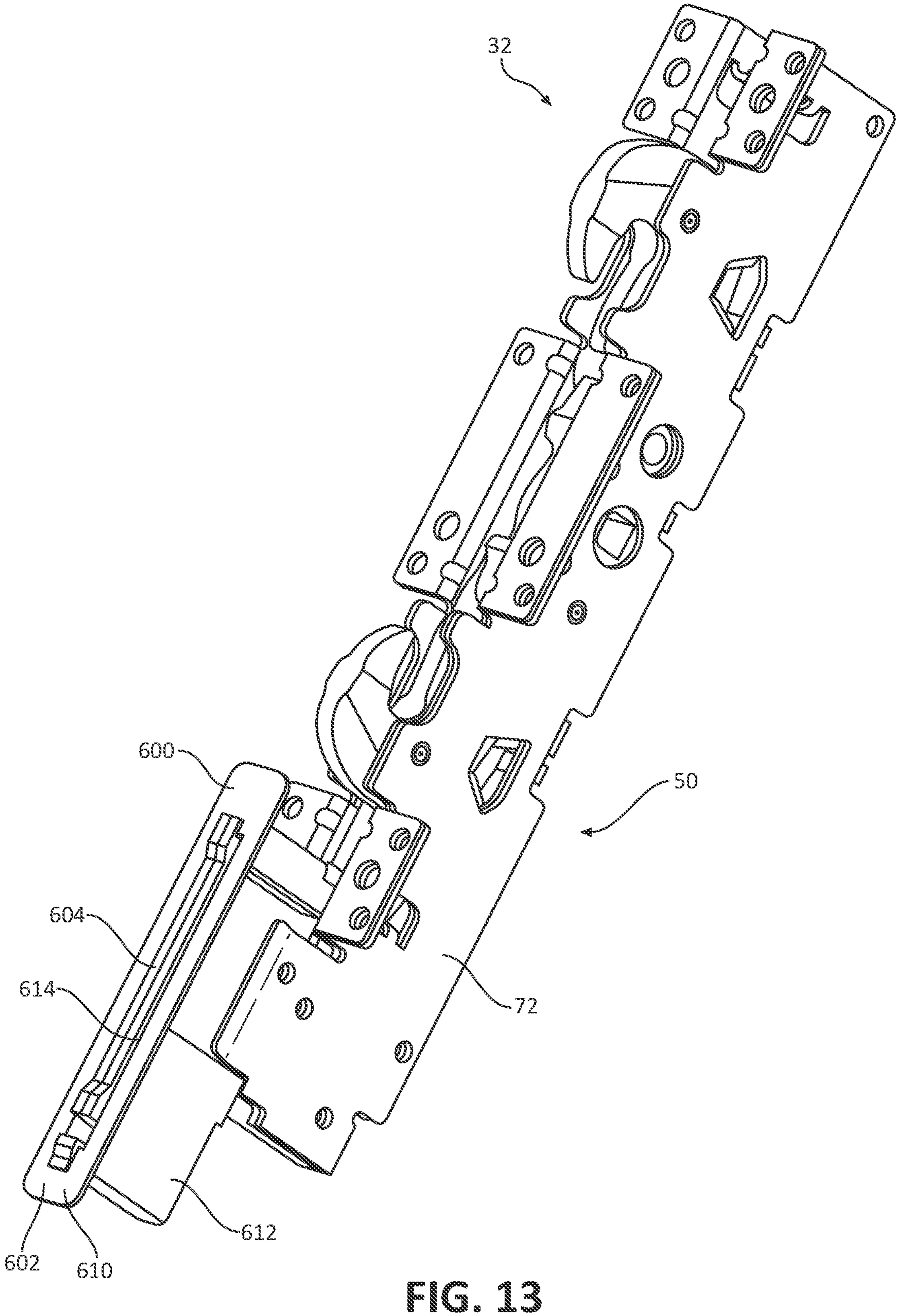
FIG. 13 is an isometric view of a lock assembly and sensor system, according to some examples.

The housing 50 of the lock assembly 32 is configured to maintain various components of the lock assembly 32 in an operational relationship with one another and to facilitate attachment of the lock assembly 32 to the panel 12. In some examples, the housing 50 includes a first plate 70 (also described as a first portion) and a second plate 72 (also described as a second portion). FIGS. 4-6 show the first plate 70 from a side view, according to some examples. For reference, FIG. 13 shows the second plate 72. The first and second plates 70, 72 are held together via any of a variety of fastening means, including bolts, welds, posts, rivets and/or other features. The first and second plates 70, 72 are optionally mirror images of one another. Therefore, in accordance with various examples, features of both the first and second plates 70, 72 are described collectively with respect to the features of the first plate 70.

As shown, the first and second catches 52, 54 are optionally substantially similar. Therefore, in accordance with various examples, features of both the first and second catches 52, 54 are described collectively with respect to the features of the first catch 52.

Figure 7:
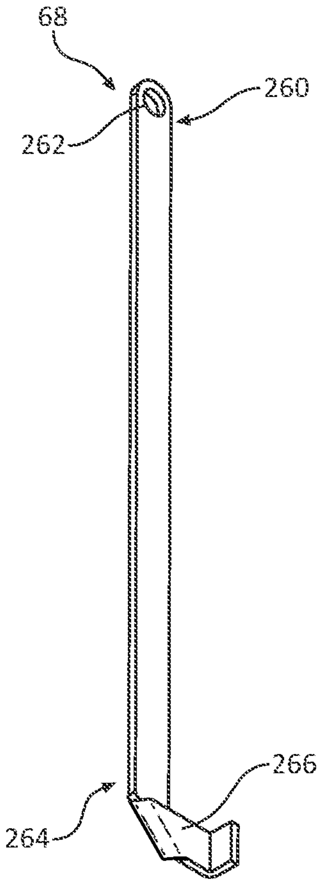
FIG. 7 is an isometric view and FIG. 8 is a side view of an accessory bar of the lock assembly, according to some examples.
Figure 8:
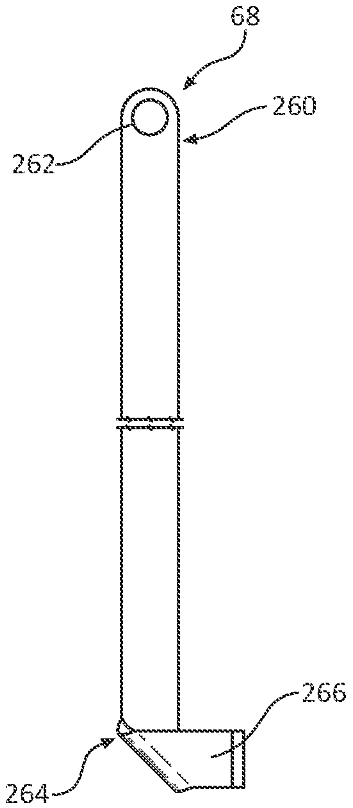
Figure 17:
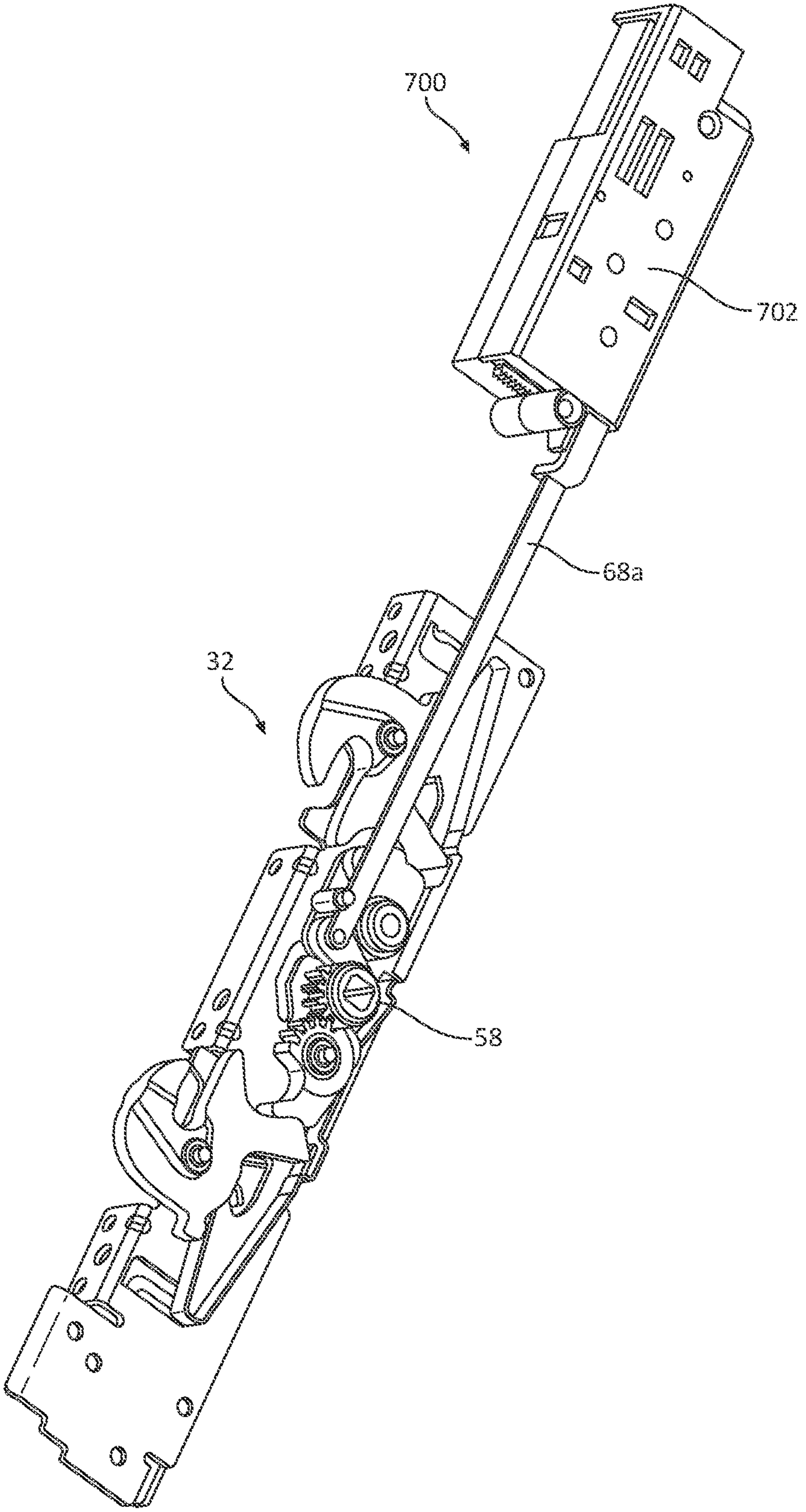
FIG. 17 is an isometric view of the actuator system, according to some embodiments.

FIG. 7 is an isometric view and FIG. 8 is a side view of the accessory bar 68, according to some examples. As shown, the accessory bar 68 is substantially elongate and includes a first end 260 having an aperture 262 and a second end 264 forming a tab 266. The aperture 262 is configured to mate with the slide post 180 of the reversal gear 58 (FIG. 17). As shown, the tab 266 is formed as a widened feature at the second end 264 of the accessory bar 68. The tab 266 can be formed as part of a bending process, for example. In some examples, the tab 266 is used to engage the accessory bar 68 with a portion of a sensor system, such as a mechanical switch of a sensor system.

As shown in FIG. 3, the strike assembly 34 preferably includes a first strike 280 and a second strike 282 spaced from the first strike 280. The first and second strikes 280, 282 are optionally substantially similar.

As shown in FIG. 6, assembly of the lock assembly 32 includes pivotally securing the first and second catches 52, 54, to the housing 50. For example, the first catch 52 is pivotally secured to housing using a pin 320 that is secured in pivot apertures of the first catch 52, the first plate 70, and the second plate 72. The second catch 54 is similarly pivotally coupled between to the housing using a pin 322 secured in pivot apertures in the first plate 70, the second catch 54, and the second plate 72.

The spring 64 is secured to the housing between the first and second plates 70, 72 and engages the stop arm 116 of the first catch 52 to yieldably bias the first catch 52 in a clockwise direction (when viewing FIG. 6). The spring 64 is engaged with the stop arm 116*a* of the second catch 54 to yieldably bias the second catch 54 in a counter-clockwise direction (when viewing FIG. 6). In some examples, the spring 64 engages the stop arms 116, 116*a* to providing an over-center bias on the first and second catches 52, 54. The spring 64 yieldably biases the first and second catches 52, 54 in a first direction when the stop arms 116, 116*a* are located on a first side of a center position (e.g., corresponding generally to an intermediate rotational position of the catches 52, 54 between the locked and unlocked positions) and in a second, opposite direction when the stop arms 116,

116*a* are located on a second side of a center position. In other words, as the catches are moved toward the locked position, the spring 64 "flips" in bias (from biasing the catches 52, 54 to the unlocked position) and yieldably biases the catches 52, 54 toward the locked position and vice versa. Stops can be used to help prevent over rotation of the catches 52, 54 beyond the locked and unlocked positions, respectively.

The cam gear 56 is pivotally secured to the housing 50 between the first and second plates 70, 72 with a pin 324 secured through pivot apertures in the cam gear 56, the first plate 70, and the second plate 72. As shown, the cam gear 56 is located between the first and second catches 52, 54, and more specifically adjacent the first catch 52, in a generally central location of the housing 50.

The reversal gear 58 is pivotally secured to the housing 50 between the first and second plates 70, 72. As shown, the teeth of the reversal gear 58 are mated with the teeth of the cam gear 56. The cam gear 56 and the reversal gear 58 have intermeshing teeth for transferring rotational movement of the cam gear 56 to the reversal gear 58, and vice versa. The reversal gear 58 is also located between the first and second catches 52, 54, and more specifically between the cam gear 56 and the lock cam 60 in a generally central location of the housing 50.

The lock cam 60 is pivotally secured to the housing 50 between the first and second plates 70, 72. The lock cam 60 is located between the first and second catches 52, 54, and more specifically adjacent to the second catch 54 and in a generally central location of the housing 50.

The link 62 is received between the cam gear 56 and the lock cam 60 and operatively links the reversal gear 58 and the lock cam 60. As shown in FIG. 6, the link 62 is pivotally secured to the reversal gear 58 and to the lock cam 60. In the unlocked state shown in FIG. 6, the link 62, the cam gear 56 and the reversal gear 58 have a nested arrangement that helps the lock assembly 32 provide a relatively compact design, according to various examples.

In some examples, the accessory bar 68 is slidably received through the arm guide 94 and is connected to the reversal gear 58 such that rotation of the reversal gear 58 (e.g., by manual or other operation) results in generally linear (e.g., vertical) sliding of the accessory bar 68. In some embodiments, this translational movement is utilized in association with a sensing operation to detect when the lock assembly 32 has been transitioned between locked and unlocked states, as described in greater detail below.

As shown in FIG. 3 the lock assembly 32 is received in the pocket 20*a* in the door stile 20 and the strike assembly 34 is received in the pocket 22*a* of the lock jamb 22. The lock assembly is secured in the pocket 22*a* using any of a variety of suitable fastening means (e.g., screws secured through the flanges of the housing). And similarly, the strike assembly 34 is secured in the pocket 22*a* of the lock jamb 22 using any of a variety of suitable fastening means (e.g., screws secured through the first and second strikes 280, 282). The first and second strikes 280, 282 and first and second catches 52, 54 are operationally aligned such that the first and second strikes 280, 282 and catches 52, 54 can be cooperatively engaged when closing the panel 12.

Figure 11:
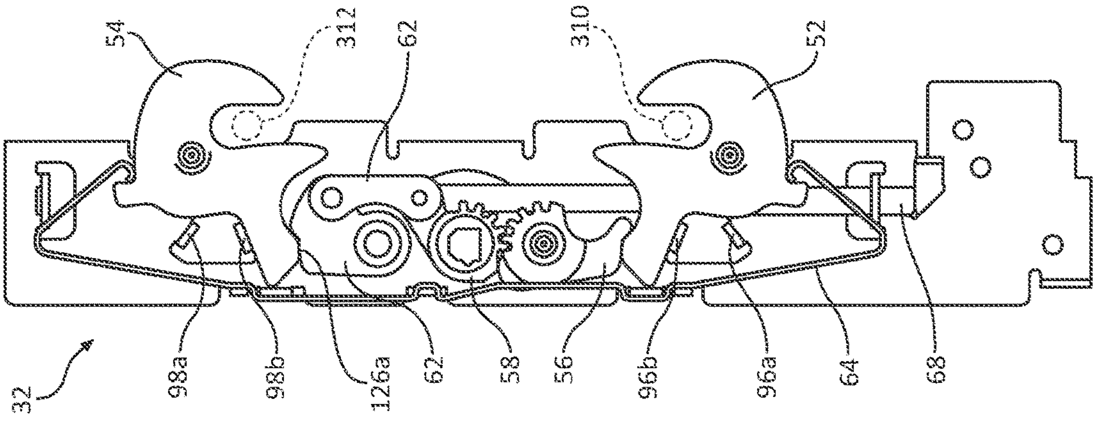
FIG. 11 is a representation of the locking system in a closed, locked state.
Figure 10:
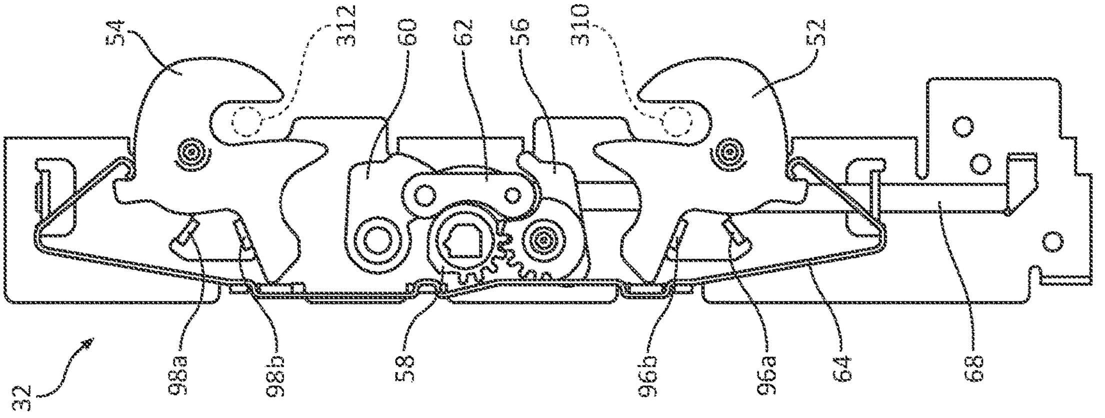
FIG. 10 is a representation of the locking system in a closed, unlocked state.
Figure 9:
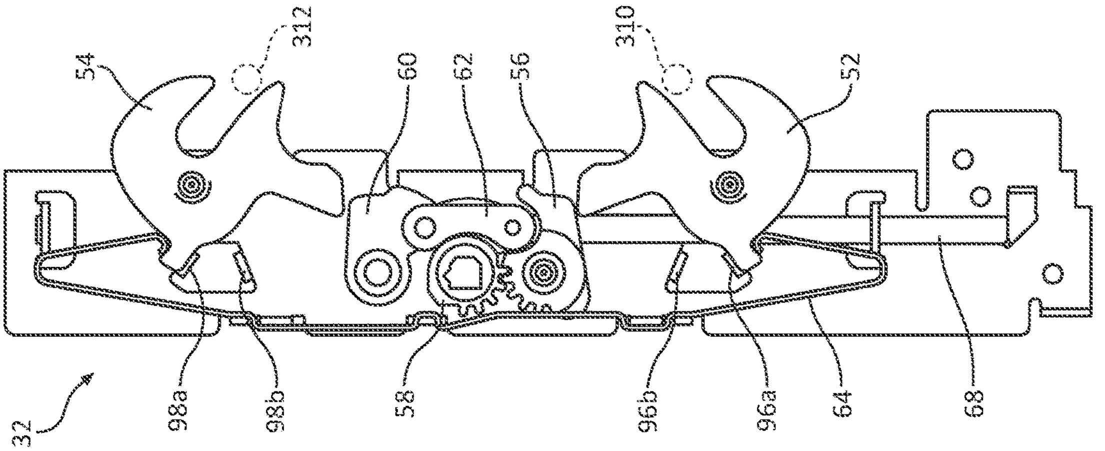
FIG. 9 is a representation of a locking system of the fenestration assembly in an open, unlocked state.

Examples of operation of the locking system 30 are provided below with reference to the figures, including FIGS. 9-11, where FIG. 9 is a representation of the locking system 30 in an open, unlocked state; FIG. 10 is a representation of the locking system 30 in a closed, unlocked state; and FIG. 11 is a representation of the locking system 30 in a closed, locked state. In FIGS. 9-11, the lock assembly 32 is shown without the second plate 72 and only strike posts 310, 312 of first and second strikes 280, 282 (FIG. 3) are shown in broken lines to facilitate operational illustration. Other features of the fenestration unit 10 are similarly not shown to facilitate operational illustration.

In use, as the first panel 12 is closed, the first- and second-strike posts 310, 312 shift the first and second catches 52, 54 against the bias of spring 64 toward an engaged position corresponding to the closed position of the fenestration unit 10. The longer jaws of each of the first and second catches 52, 54 cam against strike posts 310, 312, respectively, during sliding of the first panel 12 toward the closed position. In particular, during closing movement of the first panel 12 (e.g., in the rightward direction of FIG. 1), the first and second catches 52, 54 receive and slide against the strike posts 310, 312 which results in counter-clockwise rotation of the first catch 52 and clockwise rotation of the second catch 54 from the position in FIG. 9 to the position generally indicated in FIG. 10. Such rotation of the catches 52, 54 causes the shorter jaws to wrap around the strike posts 310, 312 so that the posts 310, 312 are progressively captured between the jaws of the catches 52, 54.

Once the first panel 12 has been moved to the closed position, the strike posts 310, 312 will have shifted the catches 52, 54 to the engaged positions shown in FIGS. 9 and 10. Although the strike posts 310, 312 are retained within the first and second catches 52, 54 is in its engaged position, the first panel 12 is freely shiftable out of the closed position (e.g., by pulling on the handle 24 (FIG. 2). That is, the first and second catches 52, 54 alone do not serve to lock the first panel 12 in the closed position.

The reversal gear 58 is rotatable between a first, locked position in which the first and second catches 52, 54 are prevented from transitioning from the second, closed position, to the first, open position and a second, unlocked position in which the first and second catches 52, 54 are able to transition from the second, closed position to the first, open position. The reversal gear 58 is also prevented from being transitioned to the locked position when the first and second catches 52, 54 are in the open position.

FIG. 11 shows the lock assembly 32 is transitioned to the fully closed, and locked position. As shown, the cam gear 56 engages the first catch 52 and rotation of the first catch 52 is substantially inhibited at this point. For example, any opening force exerted on the first catch 52 tends to result in a radial force generally toward the center of rotation of the cam gear 56. In turn, the lock cam 60 engages the second catch 54. Similarly, any opening force exerted on the second catch 54 tends to result in a radial force generally toward the center of rotation of the lock cam 60. That is, forces urging the catches 52, 54 in a direction out of the engaged position are unable to unlock the mechanism 52.

As can be seen from a comparison of FIGS. 10 and 11, the accessory bar 68 is slid vertically as the lock assembly 32 is transitioned to or from the unlocked state to the locked state. In the illustrated examples, the accessory bar 68 is retracted vertically in the locked state, although other configurations (extended, in the locked state, for example) are also contemplated.

Figure 12:
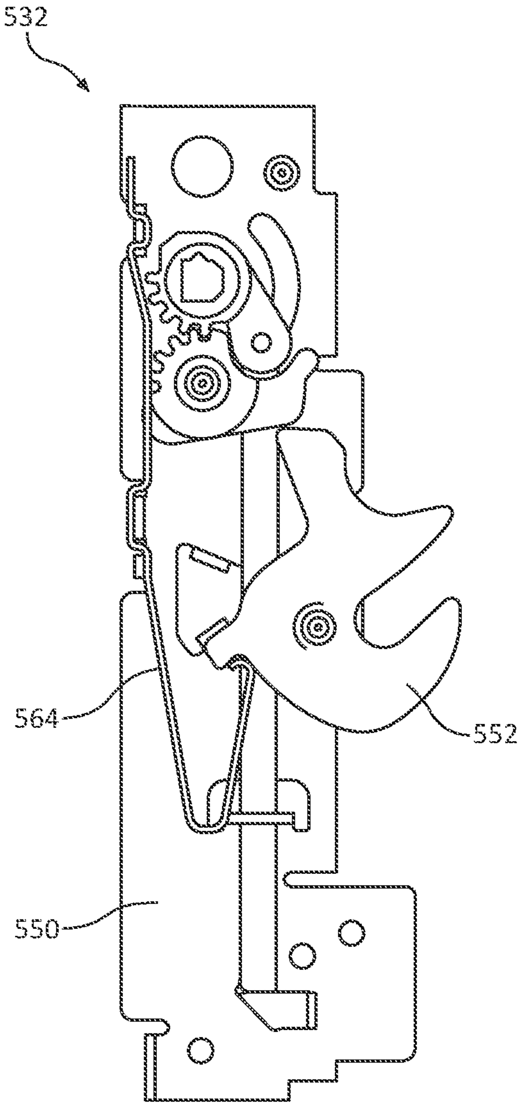
FIG. 12 shows a modified lock assembly including a single catch, according to some examples.

Although the preceding examples are made with reference to lock assemblies having multiple catches, a modified lock assembly 532 is shown in FIG. 12 including a single catch 552. As shown, the lock assembly 532 includes substantially similar components to that of the lock assembly 32, with the exception of the lock cam 60, second catch 54, and with a modified (shortened) spring 564 and housing 550. Operation of the lock assembly 532 is substantially similar to the lock assembly 32, with the exceptions noted above.

FIG. 13 is an isometric view of the lock assembly 32 showing the lock sensor system 600. As shown, the lock sensor system 600 includes a sensor housing 602 and a sensor unit 604 received in the sensor housing 602. As shown in FIG. 13, the sensor housing 604 includes a flange 610 and a body 612. The front flange 610 surrounds an opening 614 into which the sensor unit 604 is received and the body 612 defines a receptacle for receiving the sensor unit 604 and the body 612. In some examples, the flange 610 and opening 614 cooperate with the sensor unit 604 such that the sensor unit is secured in the body 612 via a snap fit with the flange 610.

The body 612 of the housing 602 is configured to be secured to the locking assembly 32, according to some embodiments. For example, the housing 602 is optionally received between the first and second plates 70, 72 of the housing 50 of the lock assembly 32. This fit is optionally a friction fit, snap fit, or other secure fit as desired. In various examples the flange 610 is oriented along the edge of the lock stile 20 to present an aesthetically pleasing, clean appearance.

Figure 14:
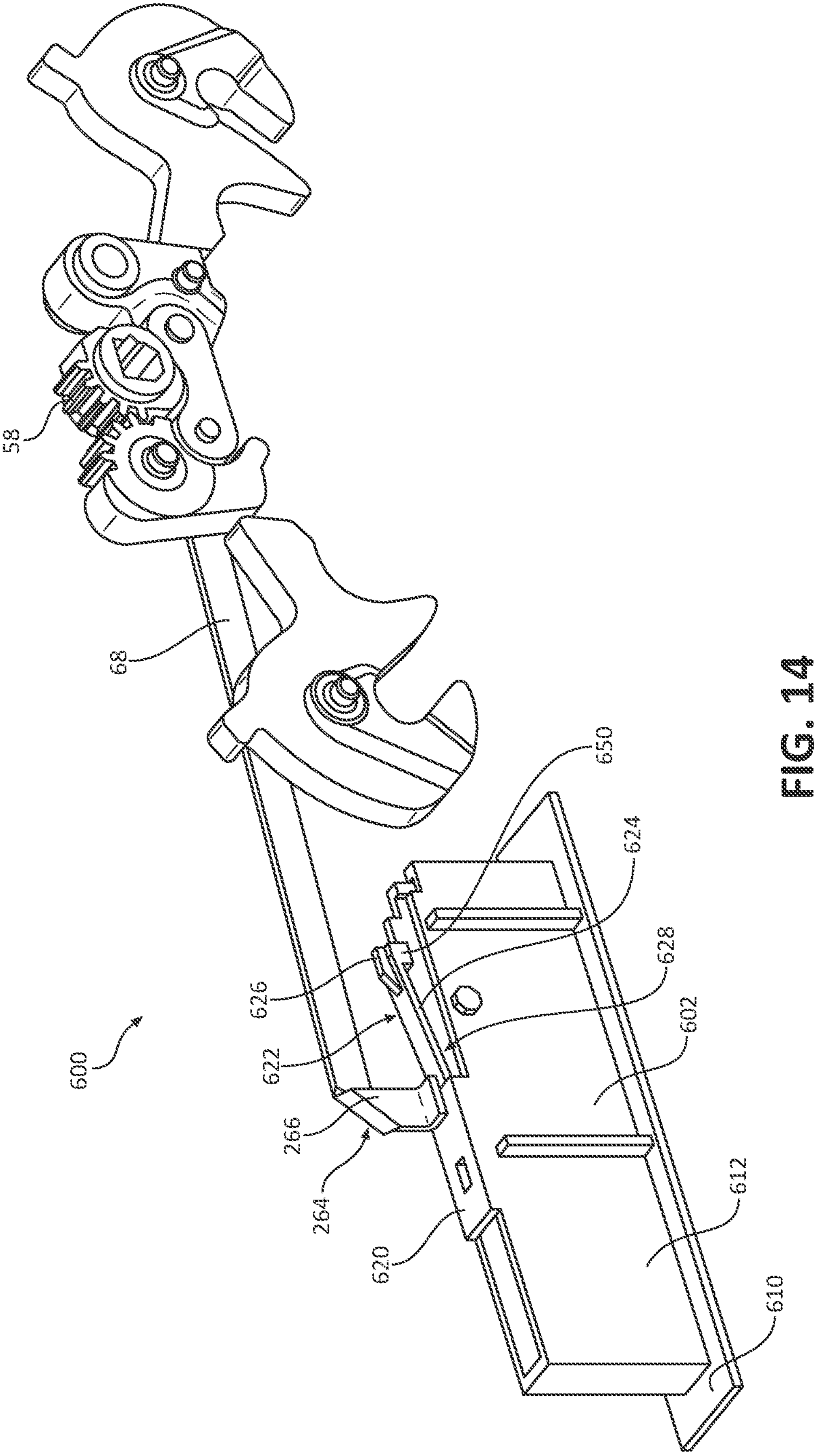
FIG. 14 is an isometric view of portions of a lock assembly and sensor system with portions of the lock assembly removed for ease of reference, according to some examples.

FIG. 14 is an isometric view of portions of the lock assembly 32 and sensor system 600 with portions of the lock assembly 32 removed for ease of reference. As show, the body 612 of the housing 602 has a rear, or back side 620 that includes a detent feature 622. The detent feature 622 includes a flexible arm 624 and a plunger 626 that interacts with a sensor element 650 of the sensor unit 604 (FIG. 13) according to some examples. As shown, the plunger 626 optionally includes a ramped or angled surface for interacting with a portion of the lock assembly 32, as described in further detail below. Underneath the plunger 626 and underneath the flexible arm 624, the back side 620 has an opening 628 so that the plunger 626 is able to physically interact with the sensor unit 604 received in the housing 602.

Figure 15:
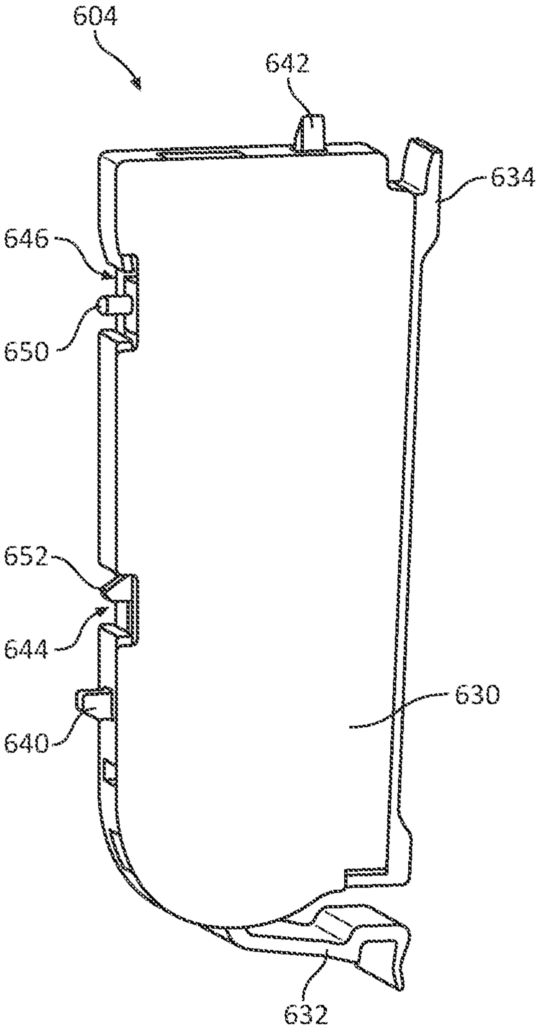
FIG. 15 is an isometric view of a sensor unit, according to some examples.

FIG. 15 is an isometric view of the sensor unit 604. As shown, the sensor unit 604 also includes a housing 630 which has a retaining projection 634 for engaging with the body 612 and/or flange 610 of the housing 602 (FIG. 14), as well as a second, snap-fit detent 632 for providing a releasable snap-fit connection with the housing 602. The housing 630 includes first and second guide projections 640, 642 which can be used to facilitate proper orientation of the sensor unit 604 in the housing 602. The housing 630 also includes first and second openings 644, 646 through which sensor elements of the sensor unit 604 can project as desired.

Figure 16:
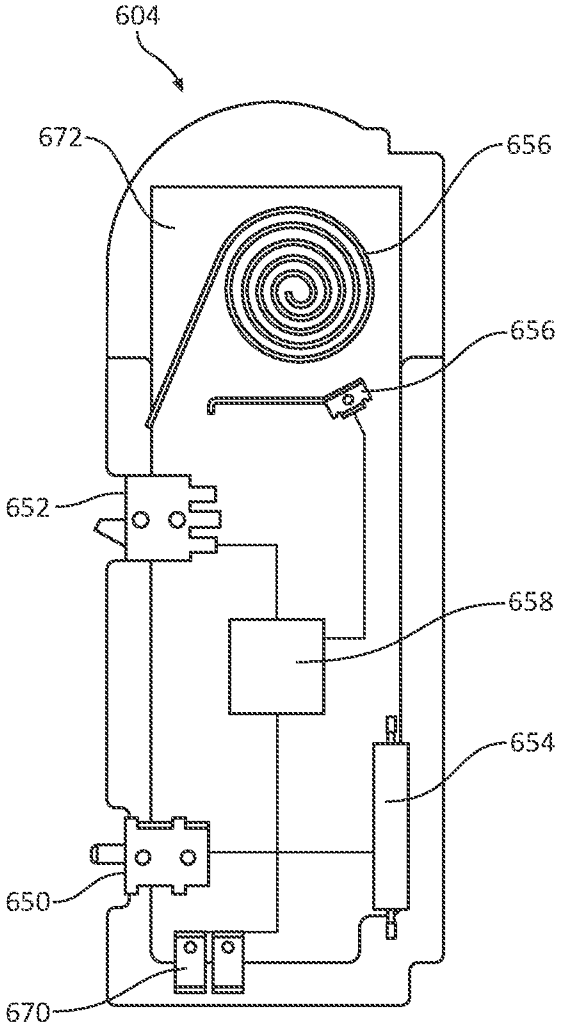
FIG. 16 is a plan view showing a sensor unit with a portion of a housing removed for reference, according to some examples.

FIG. 16 is a plan view showing the sensor unit 604 with a portion of the housing 630 removed for reference. As shown, the housing 630 of the sensor unit 604 houses various electronic components, including a first sensor element 650, a second sensor element 652, a third sensor element 654, battery contacts 656, a control processor 658, and external connection elements 670, each of which is optionally supported by and/or electronically coupled to a circuit board 672. The various components are electronically connected and additional components (resistors, capacitors, etc.) are included as desired for functionality. Though not shown, in various embodiments the sensor unit 604 includes components for wireless or wired communication as desired.

The first sensor element 650 is optionally a mechanical switch, the second sensor element 652 is optionally a mechanical switch, and the third sensor element 654 is optionally a magnetic switch (e.g., reed switch), although a variety of sensor element types (e.g., accelerometers) are contemplated. The various components are electronically connected such that activation of the sensor elements 650, 652, 654 results in sensing signals sent to the control processor 658. The control processor optionally communicates one or more of the sensing signals directly to an external receiver (e.g., wirelessly to a remote receiver) or performs one or more processing functions on the signals prior to communicating information externally to the sensor unit 604.

As shown in FIG. 15, the first sensor element 650 is exposed through the second opening 646 in the housing 630 and the second sensor element 652 is exposed through the first opening 644 in the housing 630.

As shown in FIG. 14, upon receiving the sensor unit 604 in the housing 630, the first sensor element 650 is exposed through the opening 628 in the housing 630 under the plunger 626 such that the detent feature 622 can be depressed by the plunger 626 engaging the sensor element 650 and activating it.

In some examples, the accessory bar 68 is positioned at an extended position as shown in FIG. 14 when the lock assembly 32 is in the unlocked state as shown. Upon rotating the reversal gear 58, the accessory bar 68 is retracted until the lock assembly 32 is transitioned to the locked state. The second end 264 of the accessory bar 68, and in particular the tab 266 of the accessory bar 68, slides against the plunger 626, causing the flexible arm 624 of the detent feature 622 to flex. As the arm 624 flexes, the plunger 626 is forced toward the opening 628 until the accessory bar 68 is fully retracted at the locked position of the locking assembly 32 and the plunger 626 engages the first sensor element 650 through the opening 628. This action activates the first sensor element 650 and generating a sensor signal. In some examples, the sensor signal from the first sensor element indicates that the locking assembly has been transitioned to the fully locked state. In different terms, the first sensor element provides a locked/unlocked signal that can be received by the control processor 658 and utilized as desired (e.g., wirelessly communicated to a remote receiver) to determine whether the locking assembly 32 has been transitioned to locked or unlocked states.

In some examples, the third sensor 654 (e.g., a reed switch) is positioned such that it is near a magnet (not shown) associated with the lock jamb 22 when the first panel 12 is closed. As the third sensor 654 is brought into close proximity to the magnet when the first panel 12 is closed the third sensor 654 is activated. Thus, the third sensor 654 provides an indication that the first panel 12 is "closed". Similarly, when the first panel 12 is moved away from the lock jamb 22 toward an open position, the third sensor element 654 provides an indication that the panel 12 is "open". Thus, the third sensor element 654 can be configured to provide an open/closed signal corresponding to the first panel 12 being moved between the open and closed positions. Similarly, to the locked/unlocked signal of the first sensor element 652, the third sensor may provide a locked signal that can be received by the control processor 658 and utilized as desired (e.g., wirelessly communicated to a remote receiver).

Figure 18:
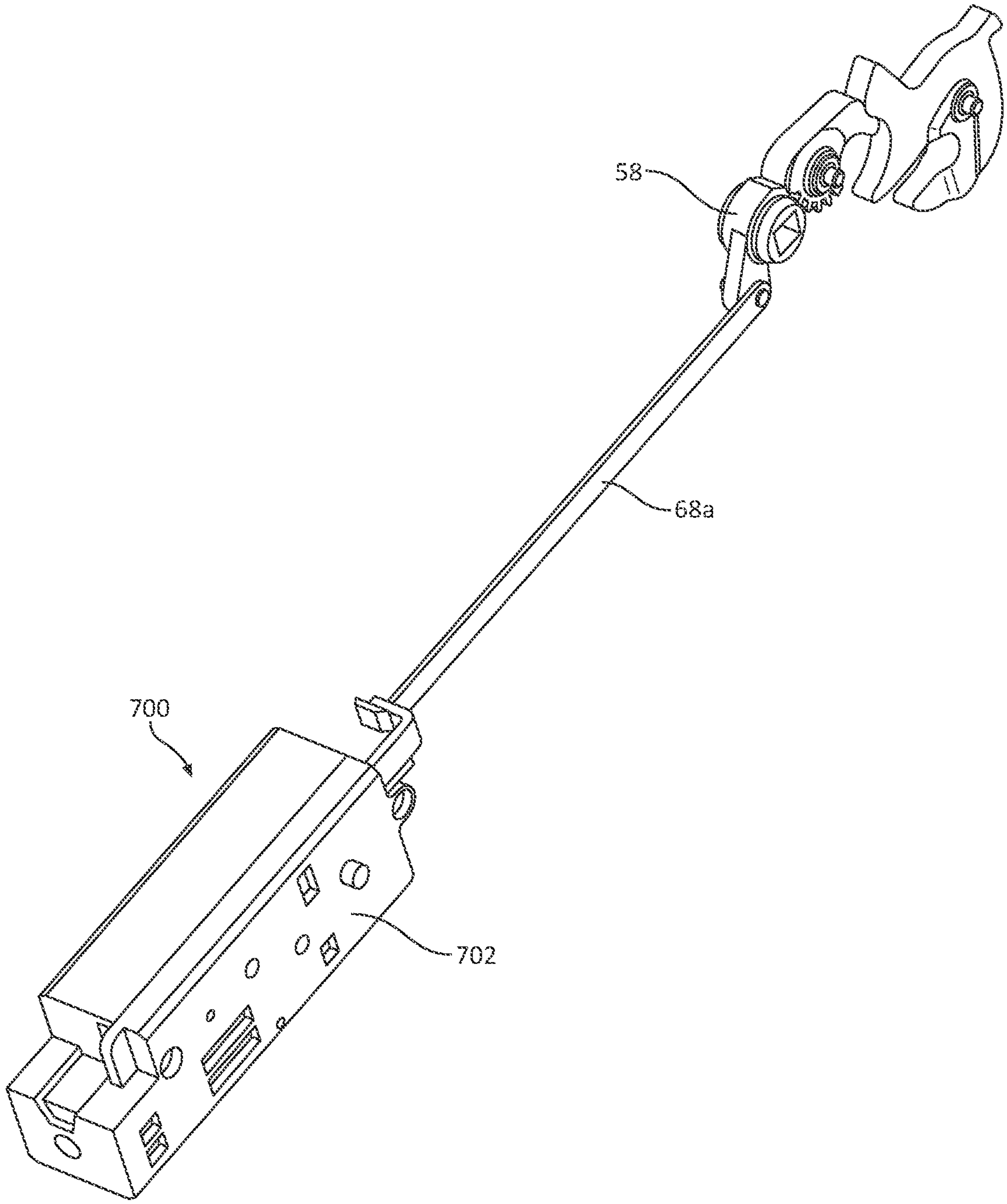
FIG. 18 is an isometric view of the actuator system, with the housing removed to reveal various internal components within the housing, according to some examples.

FIG. 17 shows an actuator system 700 that can be used with the lock assembly 32, or other lock assembly as desired. For example, in addition, or as alternative to the sensor system 600, the lock assembly 32 is optionally coupled with the actuator system 700. As indicated in FIGS. 2 and 3, the actuator system 700 is optionally received in the pocket 20*a* of the lock stile 20 or a similar feature, for example. FIG. 17 is a first isometric view of the actuator system 700 and FIG. 18 is a second isometric view of the actuator system 700, according to some examples. In FIG. 17 the second plate 72 is removed to show internal components of the lock assembly 32 and in FIG. 18 additional components are removed to simplify illustration. As shown in FIGS. 17 and 18, the lock assembly 32 is paired with an accessory bar 68*a*, which can be provided in addition or as an alternative to the accessory bar 68. As shown, the accessory bar 68*a* is coupled to the reversal gear 58 such that actuation of the accessory bar 68*a* in a first direction moves the reversal gear 58 to the locked position and in second direction moves the reversal gear 58 to the unlocked position. For reference, FIGS. 17 and 18 show the reversal gear 58, and thus the locking assembly 32, in the locked position.

Figure 19:
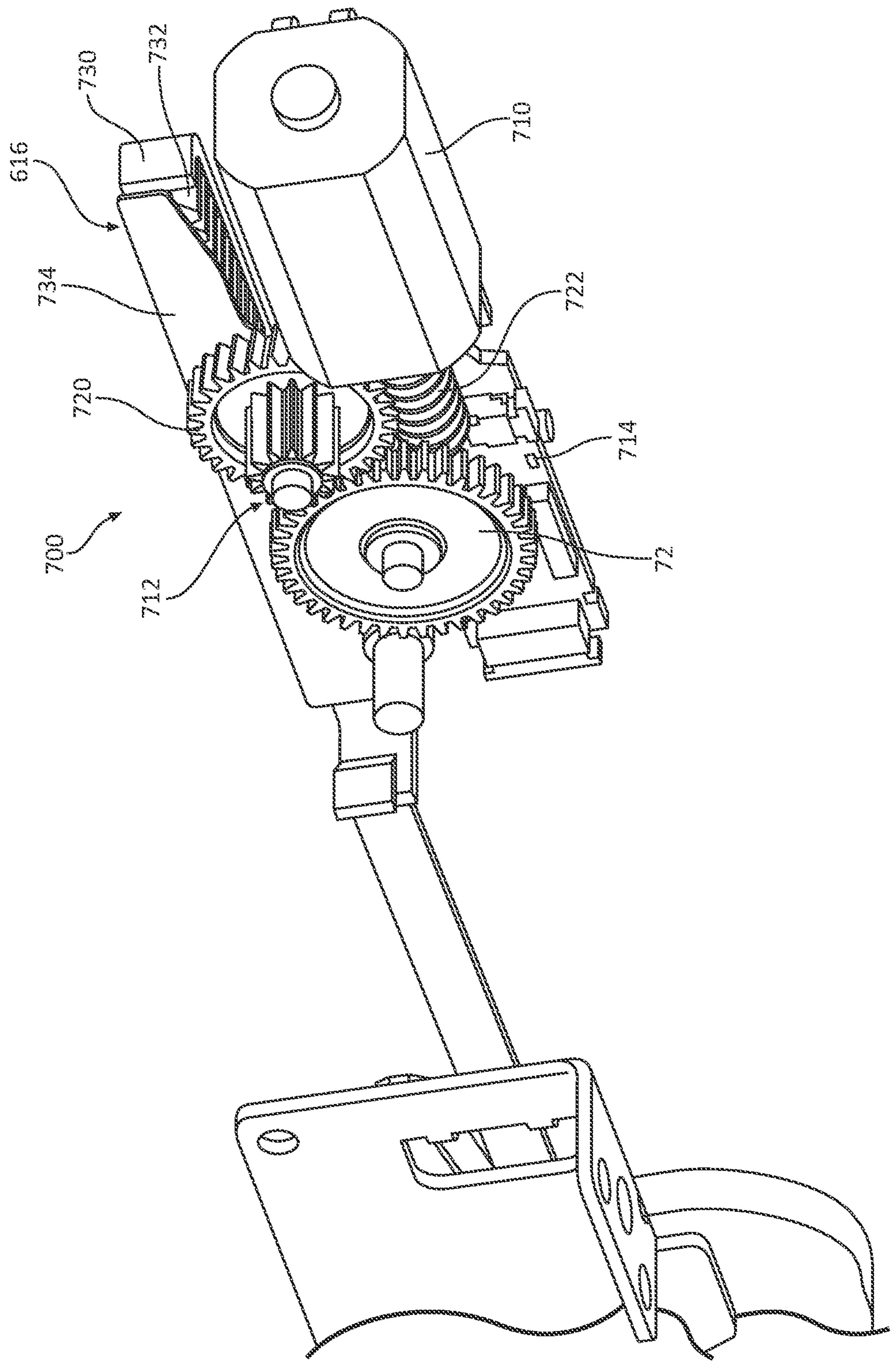
FIG. 19 is an isometric view of the actuator system with a motor and transmission removed to show underlying features in more detail, according to some examples.
Figure 20:
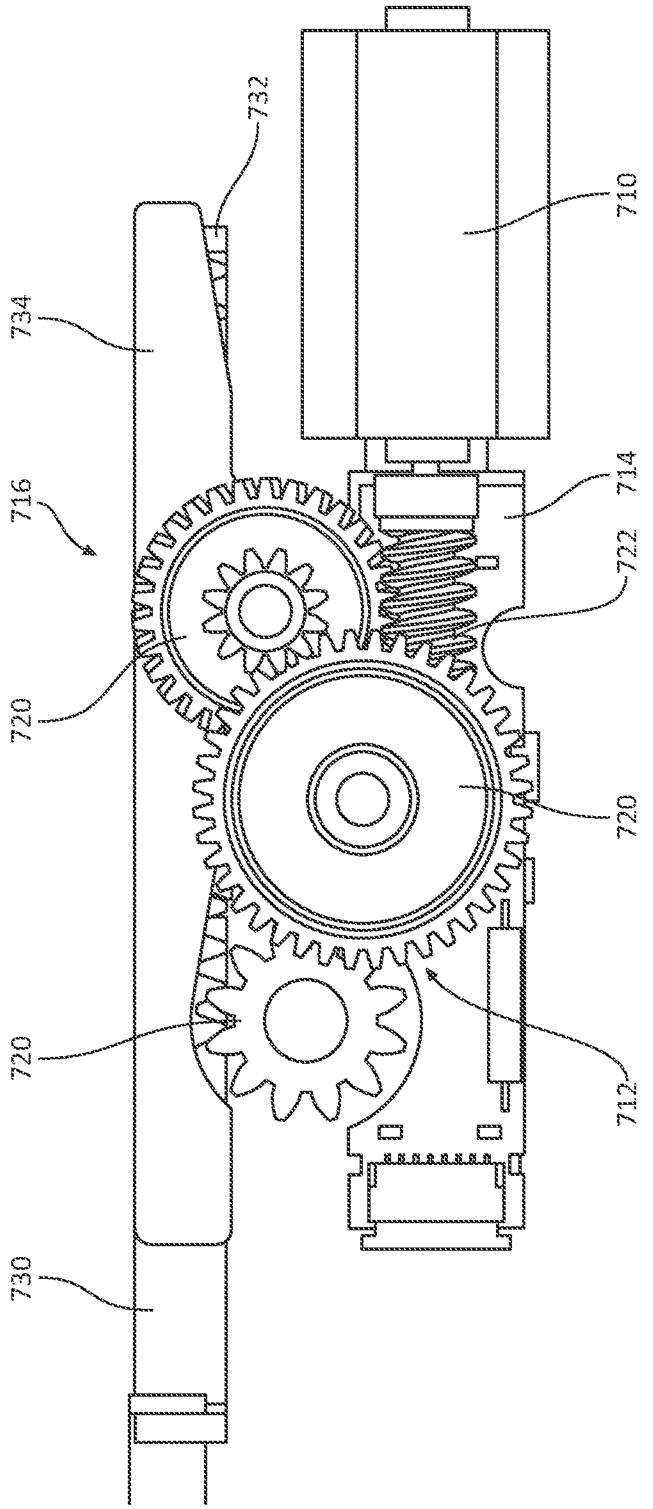
FIG. 20 is a side view of the actuator system with the above-noted portions removed for similar purposes, according to some examples.

As shown in FIGS. 17 and 18, the actuator system 700 includes a housing 702. FIG. 19 is an isometric view of the actuator system 700 and FIG. 20 is a side view of the actuator system 700, each of which shows the actuator system 700 with the housing 702 removed to reveal various internal components within the housing 702. As shown, the actuator system 700 includes a motor 710, a transmission 712, a sensing assembly 714, and a slide assembly 716.

The motor 710 is optionally a reversible, electric DC motor, although any of a variety of motors can be employed as desired.

The transmission 712 includes a gear train 720 formed by a plurality of operationally mated spur gears connected to a worm gear 722. The gear train 720 is configured as desired (e.g., with the number of gears, teeth, diameter, etc.) to achieve a desired transmission ratio. The worm gear 722 is connected to the motor 710 such that operation of the motor 710 in a first direction drives the worm gear 722 in a first direction and operation of the motor 710 in a second direction drives the worm gear 722 in a second direction. Operation of the worm gear 722 in first and second directions results in operation of the gear train 720 in first and second directions, respectively.

As shown, the slide assembly 716 includes a drive bracket member 730, a rack member 732, and a guide member 734.

Figure 21:
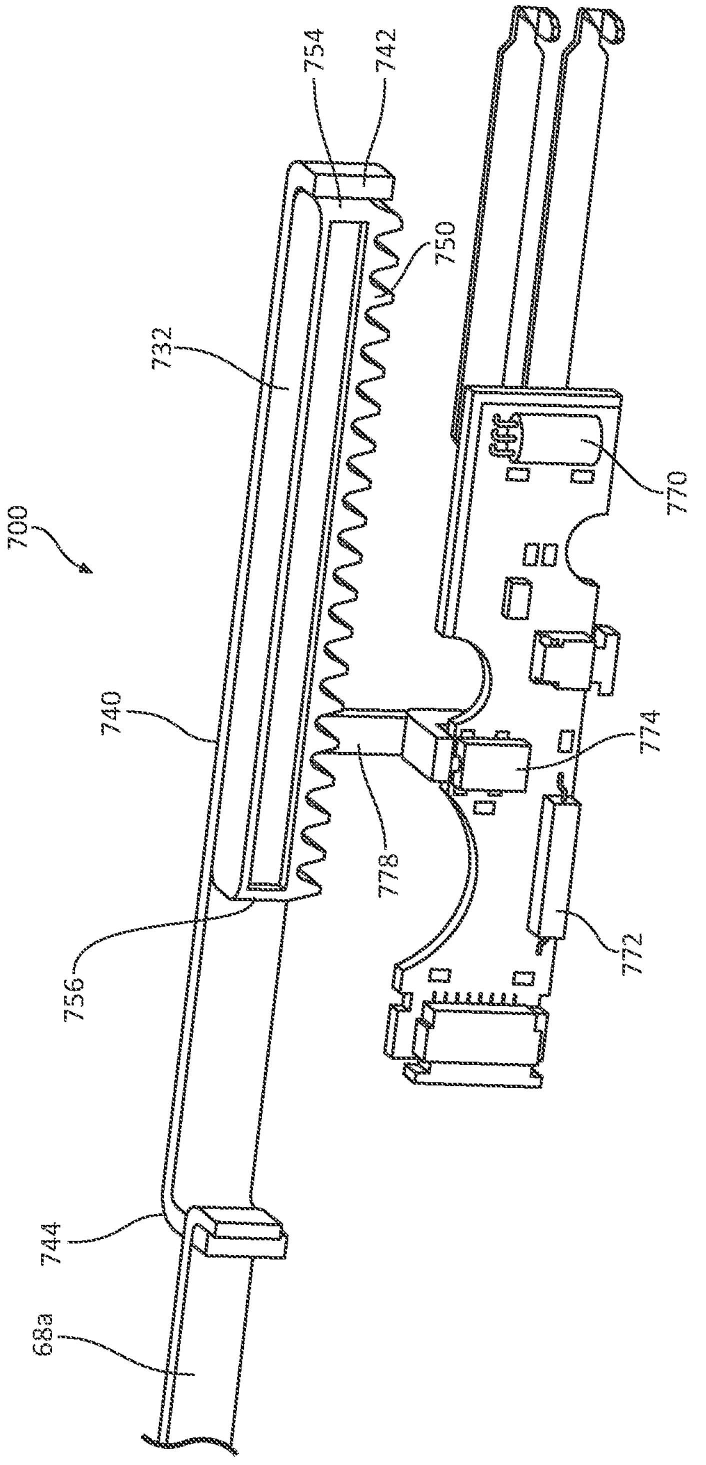
FIGS. 21 and 22 are isometric views of the actuator system with additional portions removed to show underlying features in more detail, according to some examples.
Figure 22:
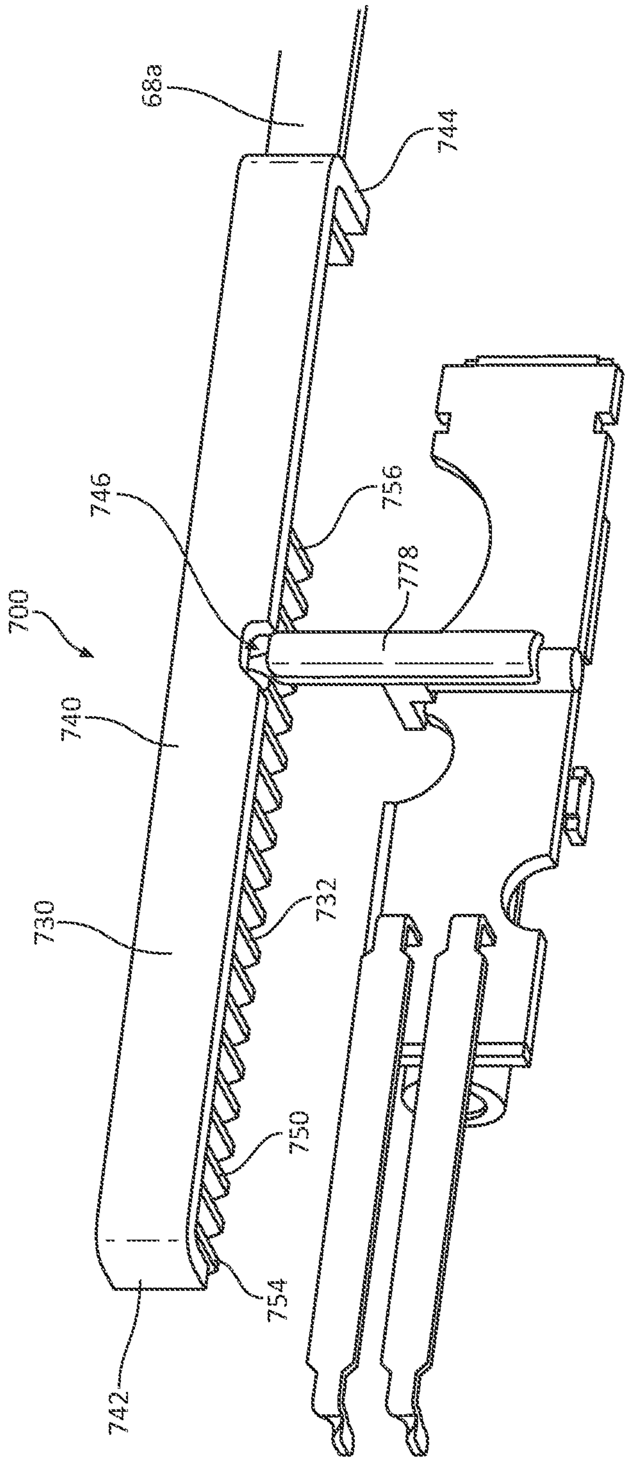

FIG. 21 is an isometric view of the actuator system 700 with the motor 710 and transmission 712 removed to show underlying features in more detail. FIG. 22 is a second, isometric view of the actuator system 700 with the above-noted portions removed for similar purposes. As shown in FIGS. 21 and 22, the drive bracket member 730 has a central portion 740 that is elongate and flat, and longer than the rack member 732, a first end portion 742 that extends angularly from the central portion 740 (e.g., orthogonally to define a first "L"), and a second end portion 744 that extends angularly from the central portion 740 (e.g., orthogonally to define a second "L"). The central portion 740 has a notch 746 (FIG. 22) for interacting with a sensor element of the sensing assembly 714, in some examples. The second end portion 744 is fixed to the accessory bar 68*a* (using a notch, as shown, or using other fastening means such as welds, screws, adhesives, or co-formation techniques) such that the drive bracket member 730 and the accessory bar 68*a* move together.

The rack member 732 is shorter than the drive bracket member 730 and is configured to be received between the first and second ends of the drive bracket member 730. The rack member 732 includes a plurality of teeth 750 formed along the body of the rack member 732 and defines a first end 754 and a second end 756.

As shown in FIGS. 18 to 20, the guide member 734 is optionally a substantially thin, flat piece that helps protect the rack member from the transmission 712 and/or other moving parts and also contains the drive bracket member 730 and the rack member 732 in the housing 702 to contain those parts as they can slide forward and backward with in the housing 702.

Figure 23:
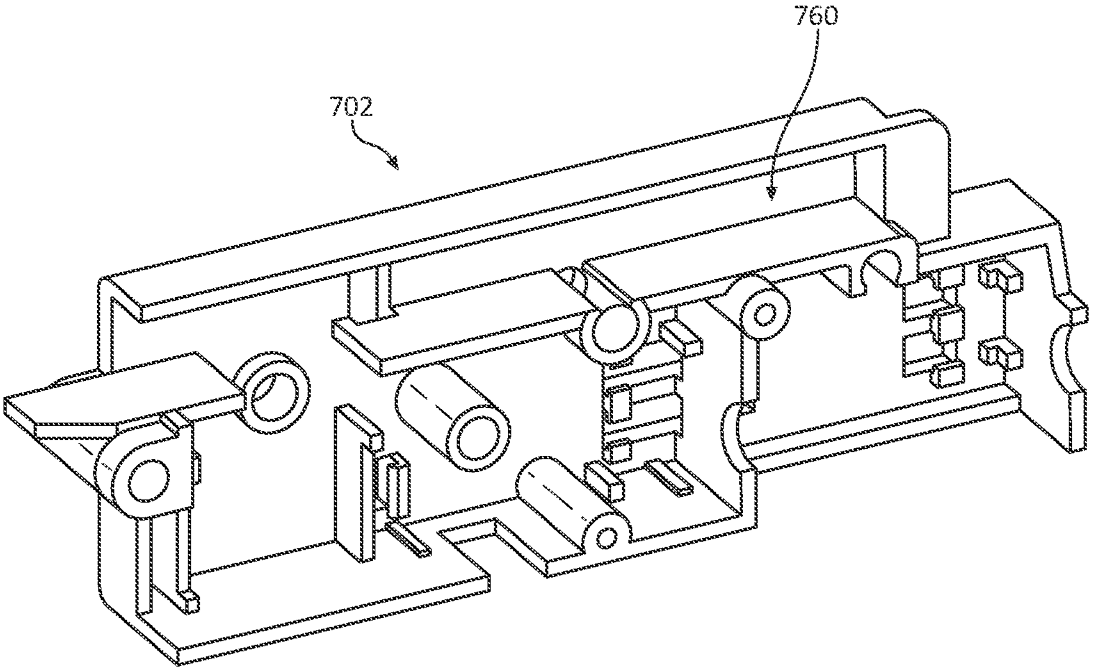
FIG. 23 is an isometric view of a portion of the housing, according to some examples.

FIG. 23 is an isometric view of a portion of the housing 702. As shown, the housing 702 forms a slide channel 760 configured to slidably receive and maintain the drive bracket member 730 and the rack member 732.

As shown in FIGS. 21 and 22, the sensing assembly 714 includes various electronic components, including a first sensing element 770, a second sensing element 772, and a third sensing element 774. The sensing assembly 714 includes power means (e.g., batteries, piezoelectric components, wired electrical connectors, such as four pin connectors, or others), data input and/or output means (e.g., wired, or wireless communication component(s)) and can include an onboard controller with processing capabilities (not shown) or be configured to communicate with an external controller, and/or other features as desired. The sensing assembly 714 is configured to direct power to and control operation of the motor and to receive and/or transmit information received from the sensing elements 770, 772, 774.

The first sensing element 770 is optionally configured to sense rotation of the motor 710. For example, the first sensing element 770 is optionally a Hall Effect sensor for measuring rotation of the worm gear 722 or other rotating components that are translated as the motor 710 is operated. As described in greater detail, the motor 710 drives the transmission 712 to move the drive bracket member 730 between a first position corresponding to the lock assembly 32 being in the locked state and a second position corresponding to the lock assembly 32 being in the unlocked state. In some implementations, the first sensing element 770 is usable to obtain information that the lock actuator 700 is in the second position and that the lock assembly 32 is in the fully unlocked position.

The second sensing element 772 is optionally configured to sense a magnetic field, such as a reed switch. In some embodiments, the second sensing element is paired with a magnet (not shown) positioned on the lock jamb 22. Upon closing/opening the first panel 12, the second sensing element 772 senses the presence or absence of the magnet and provides open/closed signals corresponding to the first panel 12 being in an opened or closed state.

The third sensing element 774 is optionally configured to sense a position of the drive bracket member 730. For example, as shown in FIG. 22, the drive bracket member 730 is in a first position, in which the drive bracket member 730 is fully retracted into the housing. The first position corresponds to the actuator arm 68*a* being fully extended and, thus, the lock assembly 32 being in the locked state. In different terms, the first position of the drive bracket member 730 corresponds to the lock assembly 32 being in the locked state. As shown, the third sensing element 774 is a mechanical switch with a plunger 778 that moves in response to the plunger 778 interacting with the notch 746 of the drive bracket member 730. As shown, the plunger 778 is able to extend upward, into the notch 746, causing the mechanical switch to change state and provide information that the lock assembly 32 is locked. Upon movement of the drive bracket member 730, the plunger 778 is pressed back toward the mechanical switch, and the third sensing element 774 is able to provide information that the lock assembly 32 is no longer in fully locked state. Thus, the third sensing 774 element provides locked/unlocked signals corresponding to the lock assembly 32 being in the locked or unlocked state.

Figure 24:
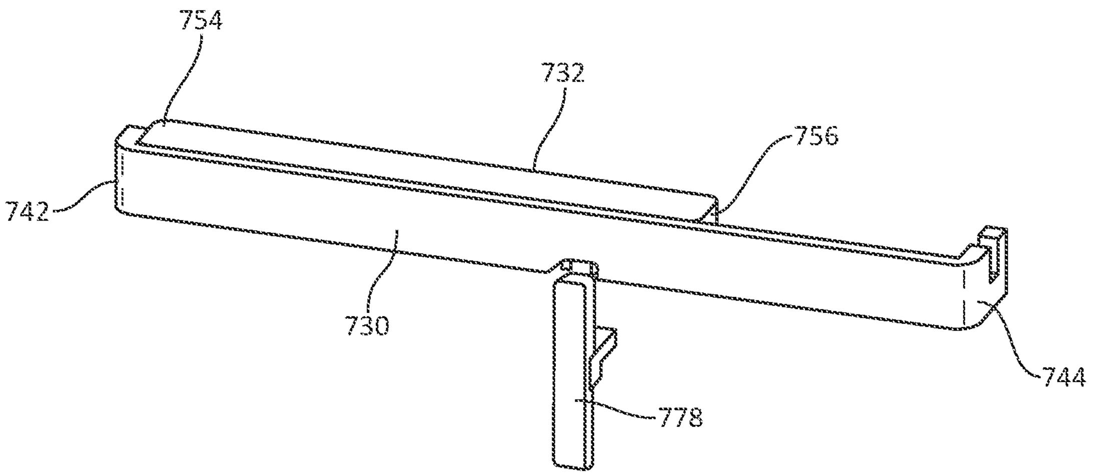
FIG. 24 shows the drive bracket member in a fully locked position and FIG. 25 shows the drive bracket member in a fully unlocked position, according to some examples.
Figure 25:
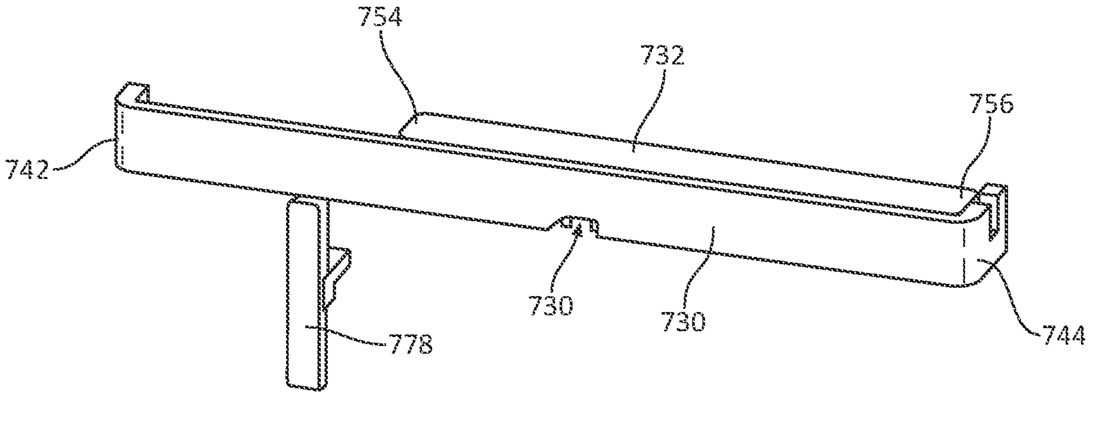

FIGS. 24 and 25 are isometric views showing interaction of the plunger 778 and drive bracket member 730, as well as the interaction of the drive bracket member 730 and the rack member 732 during operation of the lock actuator 770. As shown, the drive bracket member 730 is substantially longer than the rack member 732. As previously described, the drive bracket member 730 is connected to the accessory bar 68*a* and the rack member 732 is mated with the transmission 712 such that operation of the motor 710 results in forward and backward motion of the rack member 732.

The difference in length between the drive bracket member 730 and the rack member 732 provides sufficient travel that manual operation of the lock assembly 32 is permitted after the lock actuator 770 has been used to transition the lock assembly 32 between locked and unlocked states. For example, FIG. 24 shows the drive bracket member 730 in a fully locked position and FIG. 25 shows the drive bracket member 730 in a fully unlocked position.

In the position shown in FIG. 24, the drive bracket member 730 has been actuated back to the fully locked position by the rack member 732, pushing the drive bracket member 730 and thus the accessory bar 68*a* (FIG. 17) to the locked position, locking the lock assembly 32. In some examples, the sensing assembly 714 (FIG. 20) receives a "lock" signal (e.g., from a wireless source, such as a home automation hub) and then activates the motor 710 to drive the rack member 732, and thus, the drive bracket member 730 to the locked position, at which point the third sensing element 774 provides a signal to the sensing assembly 714. Additionally, or in the alternative, motor current is monitored during the "lock" sequence for a spike, or other increase in motor current to confirm that in addition to the drive bracket member 730, the rack member 732 has been moved to the fully locked position. Although motor current is described as one manner of confirming rack member 732 position, it should be appreciated that other sensors (e.g., an additional, mechanical/magnetic switch) are also employable.

Once the third sensing element 774 senses that the drive bracket member 730, and thus the lock assembly 32, is in the locked position and it is also determined that the rack member 732 has reached fully locked position, the sensing assembly 714 drives the rack member 732 to a neutral, intermediate position between locked and unlocked positions. In some embodiments, this intermediate position is programmed into the sensing assembly 714 (e.g., during a calibration step) and is sensed by the first sensing element 770 (e.g., by counting the number of motor rotations to the intermediate position). In the neutral, intermediate position (not shown), the drive bracket member 730 is free to slide to the unlocked position (for example, where a user manually operates the lock assembly 32) and back to the locked position (again, for example, where a user manually operates the lock assembly).

Similarly, in some embodiments, when the sensing assembly 714 receives an "unlock" instruction (e.g., from a wireless source, such as a home automation hub), the sensing assembly 714 drives the rack member 732 from the neutral, intermediate position between locked and unlocked positions to the unlocked position, unlocking the lock assembly 32. The sensing assembly 714 is optionally calibrated to the unlocked position and senses the unlocked position using the first sensing element 770 (e.g., by counting the number of motor rotations from the intermediate position to the unlocked position). Once the unlock operation is completed, the sensing assembly 714 causes the rack member 732 to return to the neutral, intermediate position (e.g., using first sensing element 770), such that the drive bracket member 730 is free to slide to the locked position (e.g., where a user manually operates the lock assembly 32).

In some embodiments, the sensing assembly 714 shares lock assembly 32 and fenestration unit status information from one or more of the sensing element(s). Such status information includes locked and unlocked (e.g., as sensed by the third sensing element 774) and open and closed (e.g., as sensed by the second sensing element 772). In some embodiments, the sensing assembly 714 will prevent operation of the lock to the locked state when the second sensing element 772 indicates that an associated fenestration unit (e.g., sliding door) is in an "open" state. Additional or alternative functionality based upon fenestration unit and lock assembly states, for example, is also contemplated.

Figure 26:
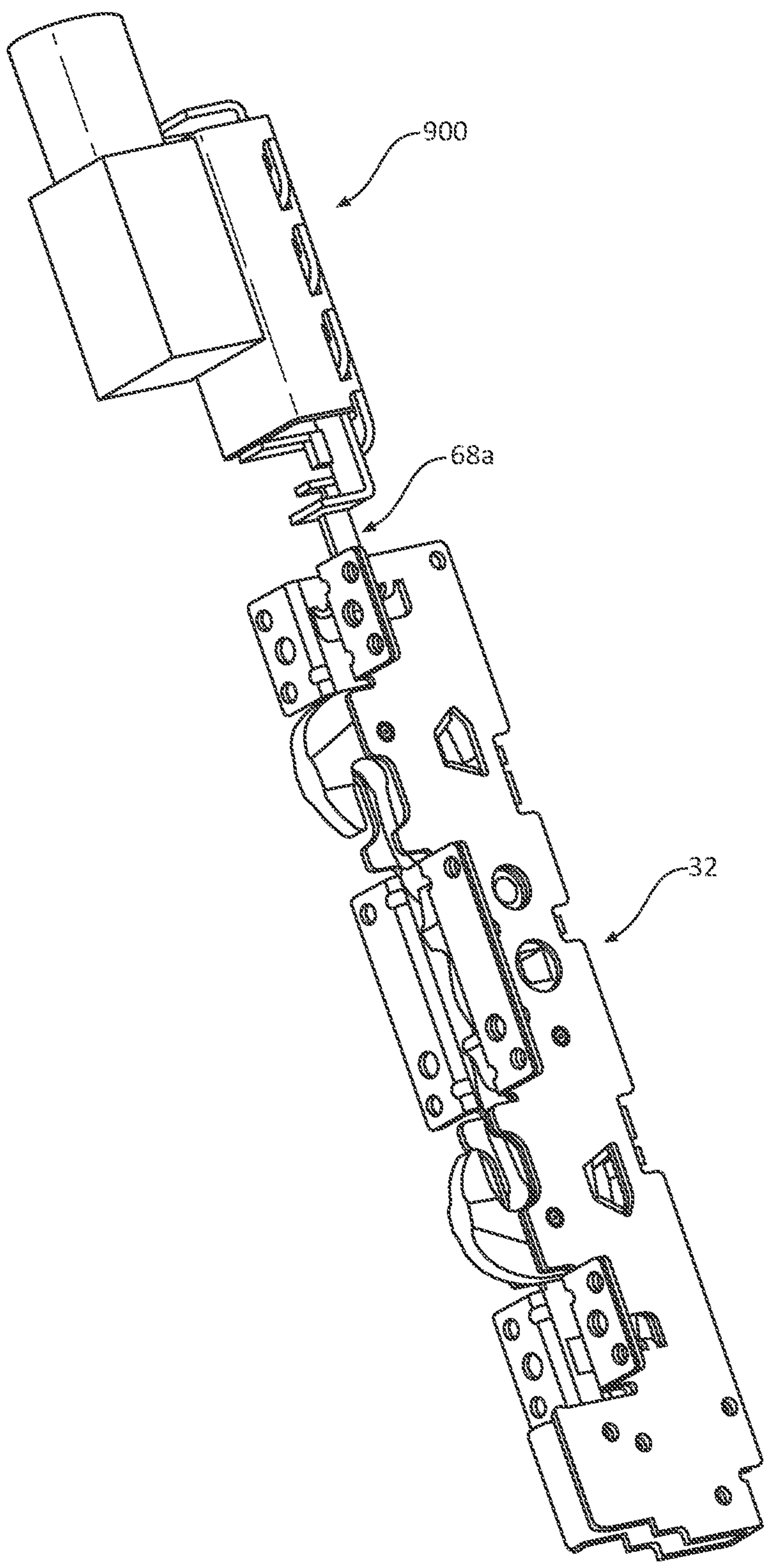
FIG. 26 shows another lock actuator, according to some examples, that can be used with the lock assembly or other lock assembly as desired.

Various embodiments utilize differing motor, sensor, and control operations as desired. Along these lines, FIG. 26 shows another lock actuator 900, according to some examples, that can be used with the lock assembly 32 or other lock assembly as desired. As shown, the lock actuator 900 is optionally connected to the accessory bar 68*a* of the lock assembly 32. Similarly, to the lock actuator 700, the lock actuator 900 is operable to lock and unlock the lock assembly 32 and includes similar housing and sensing assembly components as desired. The lock actuator 900 operates utilizing mechanical switches (e.g., micro switches) to determine locked, unlocked, and neutral positions.

Figure 27:
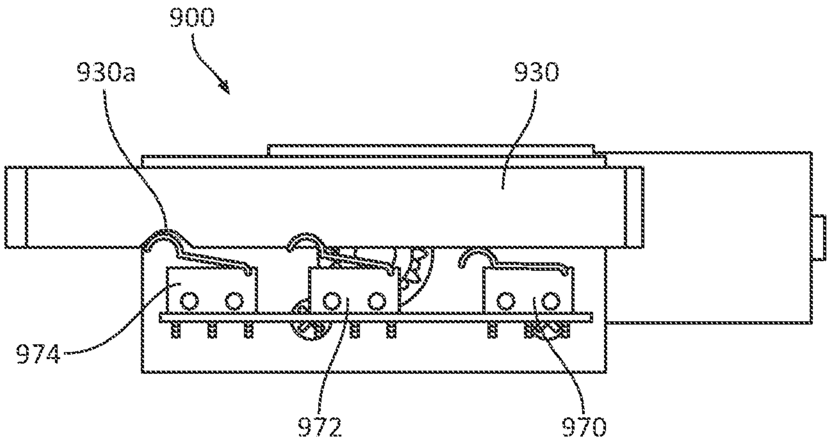
FIGS. 27 and 28 show the lock actuator with portions removed for understanding, according to some examples.
Figure 28:
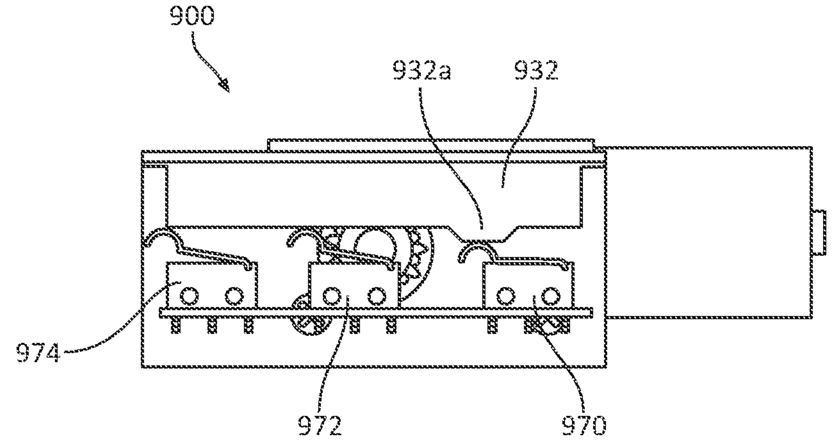

FIGS. 27 and 28 show the lock actuator 900 with portions removed for understanding. As shown, the lock actuator 900 includes a first sensing element 970, a second sensing element 972, and a third sensing element 974, each of which are mechanical switches, although a variety of sensing element types are contemplated. FIG. 27 shows a drive bracket member 930 that operates similarly to the drive bracket member 730, where the drive bracket member 930 is connected to the lock assembly 32 and can drive the lock assembly or be driven by the lock assembly 32 during transitioning between locked and unlocked states. FIG. 28 shows the drive bracket member 930 removed to reveal a rack member 932 that is similar to the rack member 932. The rack member 932 has teeth (hidden in FIG. 28) for interacting with a drive gear as shown. The rack member 932 is slidable end to end within the rack member 932 and, upon reaching one of the ends, is capable of driving the rack member 932 in a desired direction (e.g., toward, or away from a locked position). The first sensing element 970 is aligned to a feature 932*a* (e.g., a projection) on the rack member 932, such that when the rack member 932 is in the neutral, intermediate position (e.g., allowing manual operation of the lock assembly 32) the first sensing element 970 is depressed and provides a signal to a sensing assembly (not shown) of the lock actuator 900, which is optionally in communication with an on board controller (e.g., microprocessor) or an external controller located elsewhere on the fenestration unit or remotely from the fenestration unit.

The second sensing element 972 is aligned to the drive bracket member 930, and in particular is configured to interact with a feature 930*a* (e.g., a depression) of the drive bracket member 930. For example, the second sensing element 972 is optionally positioned to indicate that the drive bracket member 930 is in the unlocked position. Similarly, the third sensing element 974 is optionally positioned to indicate that the drive bracket member 930 is in the locked position. The sensing elements 970, 972, 974 provides signals to the sensing assembly (not shown) indicating these positions. In this manner, the lock actuator 900 is capable of operating similarly to the lock actuator 700, where the lock actuator 900 drives the lock assembly 32 between locked and unlocked states, and returns to a neutral, intermediate position permitting manual operation of the lock assembly 32, as well as sensing of the present state of the lock assembly (e.g., whether the lock assembly is in a locked or unlocked state).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

What is claimed is:

1. A fenestration assembly comprising:
- a panel;
- a lock assembly coupled to the panel; and
- an actuation system coupled to the lock assembly and including a motor, a gear transmission driven by the motor, a sensing assembly, and a slide assembly that includes a rack member operatively coupled to the motor by the gear transmission and a drive bracket member that is slidable relative to the rack member independent of the gear transmission and is also slidable by the rack member by operation of the motor through the gear transmission between a locked drive bracket member position and an unlocked drive bracket member position,
- wherein the drive bracket member is longer than the rack member to permit the drive bracket member to slide relative to the rack member independent of the gear transmission, and
- wherein the rack member is configured to be received along a central portion of the drive bracket member and between a first end of the drive bracket member and a second end of the drive bracket member.

2. The fenestration assembly of claim 1, wherein the rack member is spaced apart from at least one of the first end and the second end of the drive bracket member.

3. The fenestration assembly of claim 2, wherein the first end and the second end of the drive bracket member extend outwardly from the central portion, wherein the rack member is operable to contact at least one of the first end and the second end to slide the drive bracket member by operation of the motor through the gear transmission.

4. The fenestration assembly of claim 1, wherein the lock assembly includes a user input member for manually locking and unlocking the lock assembly.

5. The fenestration assembly of claim 4, wherein the drive bracket member slides relative to the rack member independent of the gear transmission when a user actuates the user input member.

6. The fenestration assembly of claim 1, wherein the rack member includes a body, a first end, a second end, and a plurality of teeth formed along the body.

7. The fenestration assembly of claim 1, wherein the sensing assembly includes a first sensing element configured to sense and to provide indication to whether the panel is in an opened state or a closed state.

8. The fenestration assembly of claim 1, wherein the sensing assembly includes a first sensing element configured to sense a rotational output of the motor and to provide an indication as to whether the lock assembly is in a locked state or an unlocked state.

9. The fenestration assembly of claim 8, wherein the first sensing element is configured to sense the locked drive bracket member position.

10. The fenestration assembly of claim 9, wherein the first sensing element includes a mechanical switch.

11. The fenestration assembly of claim 10, wherein the drive bracket member of the slide assembly includes a notch for interacting with the mechanical switch to provide a signal for indicating whether the lock assembly is in the locked state.

12. The fenestration assembly of claim 8, further comprising a second sensing element for providing an intermediate position signal when the rack member is in an intermediate rack member position between a locked rack member position and an unlocked rack member position.

13. The fenestration assembly of claim 1, wherein the actuation system drives the rack member to an intermediate rack member position between a locked rack member position and an unlocked rack member position after the sensing assembly detects that the rack member has reached the locked rack member position.

14. The fenestration assembly of claim 1, wherein the actuation system drives the rack member to an intermediate rack member position between a locked rack member position and an unlocked rack member position after the sensing assembly detects that the rack member has reached the unlocked rack member position.

15. The fenestration assembly of claim 1, wherein the drive bracket member is free to slide between the unlocked drive bracket member position and the locked drive bracket member position independent of the gear transmission by a manual operation to shift the lock assembly between a locked state and an unlocked state when the rack member is in an intermediate rack member position located between a locked rack member position and an unlocked rack member position.

16. The fenestration assembly of claim 1, wherein the motor drives the rack member through the gear transmission to a locked rack member position, which slides the drive bracket member to the locked drive bracket member position.

17. The fenestration assembly of claim 1, wherein the actuation system is configured to detect when the panel is in an open state and to prevent operation of the lock assembly to a locked state when the panel is in the open state.

18. The fenestration assembly of claim 1, further comprising a lock sensor system including a sensor unit configured to provide at least one of a locked/unlocked signal corresponding to a state of the lock assembly and an open/closed signal corresponding to a state of the panel.

19. The fenestration assembly of claim 1,
- wherein the rack member has an unlocked rack member position and a locked rack member position,
- wherein the rack member slides the drive bracket member to the locked drive bracket member position when the rack member is driven by operation of the motor through the gear transmission to the locked rack member position to transition the lock assembly to a locked state, and
- wherein the drive bracket member is slidable to the unlocked drive bracket member position independent of the gear transmission by a manual operation of the lock assembly to shift the lock assembly to an unlocked state when the rack member is in the locked rack member position.

20. A method of actuating a lock assembly of a fenestration assembly including a first panel having the lock assembly and an actuation system coupled to the lock assembly, the method comprising:

activating a motor of the actuation system to drive a gear transmission which engages a rack member of the actuation system to push a drive bracket member of the actuation system to move an accessory bar coupled to the lock assembly to a locked position, the drive bracket member and the rack member have different lengths to allow manual sliding of the drive bracket member relative to the rack member, wherein the rack member is received along a central portion of the drive bracket member, and wherein the drive bracket member is manually slidable relative to the rack member independent of the gear transmission.

21. The method of claim 20, wherein the accessory bar is configured to move vertically in response to the push from the drive bracket member.

* * * * *